United States Patent
Wu et al.

(10) Patent No.: US 7,664,057 B1
(45) Date of Patent: Feb. 16, 2010

(54) AUDIO-TO-VIDEO SYNCHRONIZATION SYSTEM AND METHOD FOR PACKET-BASED NETWORK VIDEO CONFERENCING

(75) Inventors: Fang Wu, Pleasanton, CA (US); Wen-hsiung Chen, Sunnyvale, CA (US); Walter R. Friedrich, Pleasanton, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 797 days.

(21) Appl. No.: 10/890,581

(22) Filed: Jul. 13, 2004

(51) Int. Cl.
*H04L 12/16* (2006.01)
*H04Q 11/00* (2006.01)
*H04L 12/66* (2006.01)
*H04J 3/16* (2006.01)
*H04J 3/22* (2006.01)
*H04J 3/24* (2006.01)
*H04J 3/06* (2006.01)
*G06F 15/16* (2006.01)

(52) U.S. Cl. .............. 370/260; 370/270; 370/352; 370/467; 370/471; 370/473; 370/509; 709/204

(58) Field of Classification Search ............. 370/260, 370/270, 304, 467, 471, 473, 902, 352, 412, 370/429, 487; 709/204
See application file for complete search history.

(56) References Cited

U.S. PATENT DOCUMENTS

| | | | |
|---|---|---|---|
| 4,821,119 A | 4/1989 | Gharavi | 375/240.16 |
| 5,640,420 A | 6/1997 | Jung | 375/240 |
| 5,751,232 A | 5/1998 | Inoue et al. | 341/63 |
| 2003/0220971 A1 * | 11/2003 | Kressin | 709/204 |
| 2004/0022262 A1 * | 2/2004 | Vinnakota et al. | 370/429 |
| 2005/0180341 A1 * | 8/2005 | Nelson et al. | 370/260 |
| 2005/0195860 A1 * | 9/2005 | Ollis et al. | 370/487 |
| 2005/0259694 A1 * | 11/2005 | Garudadri et al. | 370/503 |

FOREIGN PATENT DOCUMENTS

EP 1316957 A1 * 6/2003

OTHER PUBLICATIONS

RFC 3550 by Schulzrinne et al. published on Jul. 2003.*
RFC 1889 by Schulzrinne et al. published on Jan. 1996.*
MPEG Stream Encapsulation into RTP packets by Hazboun published on Sep. 1998.*
"Real Time Protocol (RTP)." *HelloSoft Inc.*, San Jose, CA. Available online at http://www.hellosoft.com/resources/documents/rtp.pdf Accessed on Apr. 14, 2005.

* cited by examiner

*Primary Examiner*—Daniel J Ryman
*Assistant Examiner*—Nishant B Divecha
(74) *Attorney, Agent, or Firm*—Dov Rosenfeld; Inventek

(57) ABSTRACT

Synchronizing audio and video streams in packet-based networks requires synchronization of packet timestamps. The present invention provides such synchronization without resort to a network time standard. In one embodiment of the present invention, pairs of timestamp synchronized signals, such as audio and video signals, not having a common timestamp clock are mixed. One of the signals, for example, the audio signals, is mixed first while preserving the original audio timestamps. The preserved timestamp information is then used to synchronize the timestamps of the unmixed signals, in this example the video signals, to provide synchronization of all signals. In another embodiment, the present invention uses packets containing calibration of timestamps to reduce jitter. The present invention also includes specifications for a packet for transmitting timestamp information.

68 Claims, 16 Drawing Sheets

AUDIO-TO-VIDEO SYNCHRONIZATION SYSTEM AND METHOD FOR PACKET-BASED NETWORK VIDEO CONFERENCING

BACKGROUND OF THE INVENTION

This invention is related to multimedia communications systems, and in particular to a method of synchronizing audio and video streams over a packet network without relying on a network time standard.

BACKGROUND

Multimedia multipoint conferences, commonly called multimedia teleconferences, are becoming more widespread. A multimedia teleconference allows three or more participants at a plurality of locations to establish bi-directional multimedia communication in a shared audio-visual environment that gives the impression that the participants are all at the same place.

Packet-based networks, and in particular IP-based packet networks, are being used with increasing popularity for multimedia conferences. Packet-based networks (also referred to herein as "packet networks") provide communication between network locations by transmitting as a sequence of individual, timestamped packets. The transmission of individual packets between two network locations through packet-based networks can occur over different routes with different transmission times, and thus the packets are not necessarily received in the transmitted order. Packet networks thus do not inherently provide real-time communication. One approach to providing better real-time data transmission across packet networks is through the use of protocols, such as RTP (real-time control protocol). RTP operates on top of UDP and is independent of the lower underlying network layers, and provides the functionality to packetize the real-time data for transmission on the network so that the data can be reconstructed into the original sequence upon reception.

RTP packets have a header that marks and sequences the data and a trailer, or payload, containing the data being transmitted. The header identifies the type of data being transmitted, a timestamp and sequence number to uniquely identify and provide a sequence for the packets, other information about the data, such as video frame number or other information. RTP control protocol (RTCP) is a companion protocol to RTP that gathers statistics related to the quality of the network on which the RTP packets are transmitted, and sends these statistics to the senders of the RTP packets. This information is used to control the flow of packets through the network to improve communications. The RTP protocol is described in "RTP: A Transport Protocol for Real-Time Applications" (Schulzrinne, H., Casner, S., Frederick, R., and Jacobson, V, RFC 3550, July 2003) and "RTP Profile for Audio and Video Conferences with Minimal Control" (Schulzrinne, H., Casner, S., RFC 3551, July 2003).

Providing multimedia communications services in a packet network requires additional protocols. One such protocol, a variation of which uses RTP, is outlined in Recommendation H.323 titled "Packet-based multimedia communications systems" (International Telecommunication Union, Geneva, Switzerland). That recommendation describes the use of packet networks for connecting locations or sites, through local area networks (LANs), wide area networks (WANs), public networks or internetworks such as the Internet, point-to-point dial up connections over PPP, or by using some other packet-based network protocol.

In multimedia teleconference systems operating over packet networks, participants have terminals that send and receive audio or audio and visual content over the network. The terminals covert outbound content into streams of data packets that meet the appropriate network communications standards. Data packets are routed through the network and to terminals at other locations in the network, where they are converted for display at a terminal as sound, or as sound and images as the terminal allows.

In more advanced multimedia teleconference systems, each terminal receives and displays content from one or more of the other terminals. A multipoint videoconference generally allows participants at each location to receive audio from one or more other locations and to view video from more than one other location, optionally including the viewer's location. The content displayed at each terminal is composed by combining content provided by multiple terminals. The combination of audio and video that may originate from more than one terminal is referred to herein as audio mixing and video composing without regard to how many sites are audible or visible at a time. The term "video composing" refers to the arrangement of images from two or more video sources onto a single display. One example of video composing that is not meant to limit the scope of the present invention is the placing of images from two video cameras side-by-side on a single display. The term "combining" refers in general to the processing of signals into a new form, for example, the mixing of audio or the composing of video.

Since packet networks do not inherently provide for real-time communication, effective teleconferencing systems require that the video and audio signals from different sources be synchronized ("lip synced") for a realistic multimedia teleconference experience. As one example, it is preferred that audio and video signals are synchronized when mixing so that the audio is lip synced with the video. Mixing audio or composing video over a packet network requires assembling the appropriate data packet streams in the original order using the packet timestamp, buffering the streams to be mixed in memory to provide synchronicity, decoding each data stream in the proper time sequence into mixable content—such as frames of video or a slice of time of audio signals—combining the signals, and then coding the signals into a new stream of data packets corresponding to the mixed content having a new timestamp. In general, there is a difference in the delay of the arrival of different signals from their point of origin, and thus some method must be employed to ensure synchronicity.

One prior art method of synchronizing signals is to provide timestamps to RTP packets that are generated by or that are referenced to a network standard time, as illustrated in the schematic of FIG. 1 as a prior art system for a multimedia teleconference system 100. In the prior art embodiment of FIG. 1, NTP (network time protocol) is used to request time from the master clock (an "NTP server"), providing a standard against which the clocks of other computers on the network can be synchronized. System 100 is based on Recommendation H.323, and uses a network time clock to synchronize each timestamp clock in the network. Endpoint terminals, indicated as "interactive video group systems" and "desktop video conferencing systems" are networked through a PSTN or private voice network by IDSN, T1 or DSL lines, or through a local/wide area network under TCP/IP by internet lines, which also contain a Gatekeeper. The networks are linked by a Gateway. Mixing and distribution of data packet-based multimedia teleconference systems is typically performed in a Multipoint Control Unit (MCU). The MCU ensures that connections are properly setup and released, that audios and videos are mixed, and that the data are distributed among the conference.

A master clock provides a standard time to any device on the network that requests a reference time. NTP includes network request that return an NTP timestamp that can be used to set a clock time or that can be encoded into a RTCP sender report for a later determination of the time of an event. The master clock provides a common time reference that associates a media-specific RTP timestamp with the common "wallclock" time shared across media, and can be used to compose or otherwise mix different signals.

While the use of a reference time to synchronize clocks to provide signal synchronization across a network is effective, this method has several problems. For example, the use of a clock standard, such as a network clock by NTP, requires that there is a clock that is accessible over the network to other clocks requesting a time check. If NTP is not working when requested, for example the time standard is not running or is not accessible over the network, then it is not possible to synchronize streams based on an accurate clock time. Also, the handshake protocols between devices and the NTP server can add an appreciable overhead.

Thus there is a need in the art for a method and apparatus that permits the synchronization of mixed audio and composed video without reliance on a reference clock. Such a method and apparatus should be compatible with existing systems and capable of handing arbitrary numbers of audio and video signals.

SUMMARY

The present invention overcomes the disadvantages of prior art synchronization systems by synchronizing streams without reference to an external clock. For the example of an IP switched network using RTP, the present invention provides for synchronization without having to include reference clock times or timestamps. As such, the present invention provides synchronization without requiring that all timestamping devices are synchronized.

It is one aspect of the present invention to synchronize signals for mixing or composing across a network without reference to a common network time.

It is another aspect of the present invention to synchronize signals for mixing or composing by preserving original timestamp information and transmit the timestamp information across the network. In one embodiment of the present invention, the timestamp information is transmitted from one location for combining signals to another location for combining signals. In another embodiment of the present invention a portion of a plurality of signals is combined at a first location in a network to form a combined signal, and the combined signal is then further combined with the remaining uncombined signals at the second location. Timestamp information of the signals when combined at the first location is provided to the second location, where it is used to synchronize the combined and uncombined signals.

It is one aspect of the present invention to provide a packet of a data stream for routing in a packet network, where the data stream is a combination of a first data stream having first timestamps and a second data stream having second timestamps not synchronized with said first timestamps. The packet includes at least one timestamp of said first timestamps and at least one timestamp of said second timestamps.

It is another aspect of the present invention to reduce jitter by providing calibration packets including the time delay between data streams to a synchronizer.

The present invention overcomes the limitations and problems of the prior art using a method that has a low overhead, is easy to implement, improves synchronization, and removes jitter from the combined streams.

These features together with the various ancillary provisions and features which will become apparent to those skilled in the art from the following detailed description, are attained by the exercise device of the present invention, preferred embodiments thereof being shown with reference to the accompanying drawings, by way of example only, wherein:

Figure 1:
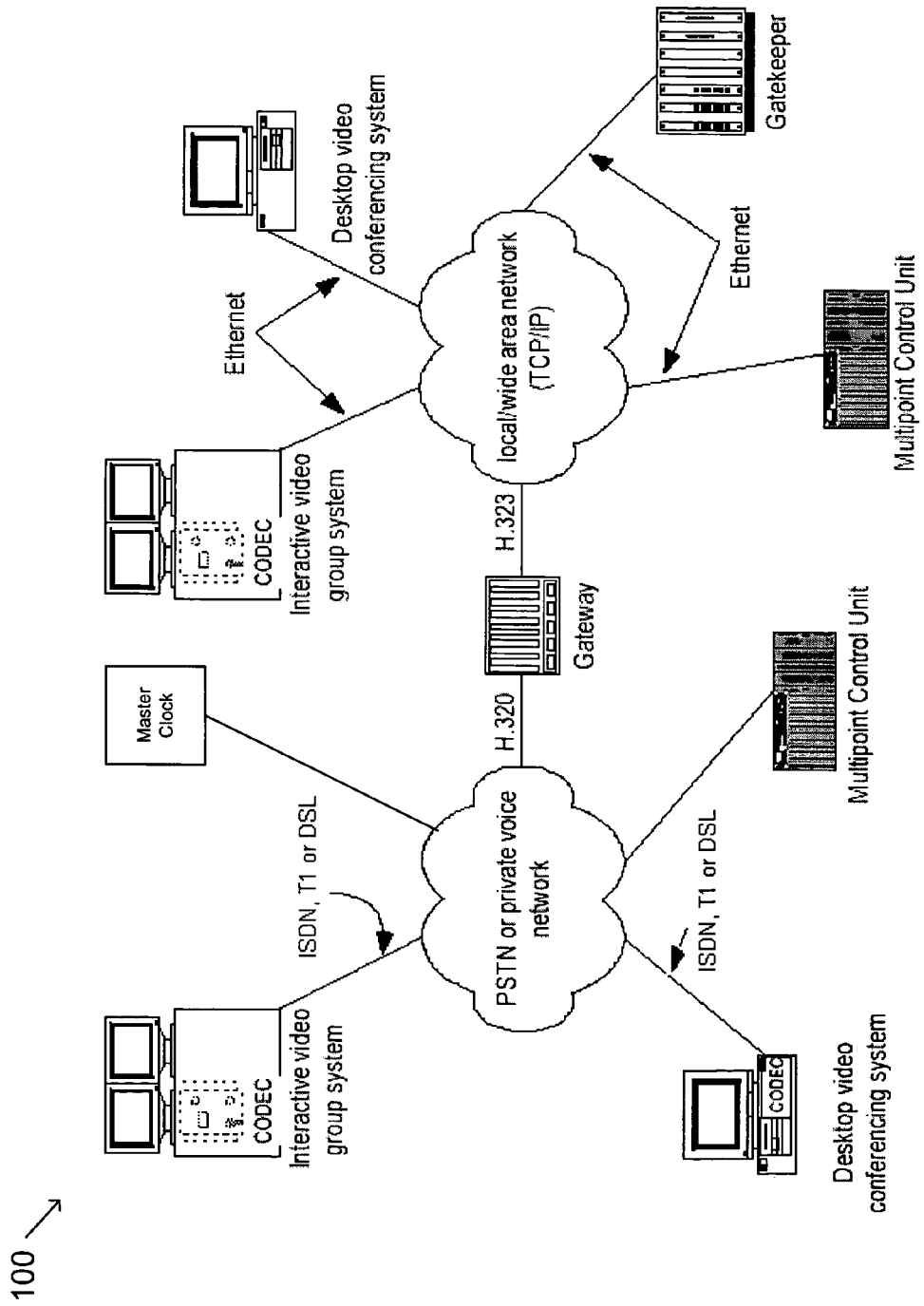
FIG. 1 is a schematic of a prior art network for synchronizing audio and video using a network time standard clock.

Reference symbols are used in the Figures to indicate certain components, aspects or features shown therein, with reference symbols common to more than one Figure indicating like components, aspects or features shown therein.

DETAILED DESCRIPTION

The present invention will now be described with reference to FIG. 2A, which shows a multimedia teleconference system 200 of the present invention. System 200 is a specific embodiment illustrating a packet network, or packet network 202 that provides for the synchronized mixing and composing of data streams transmitted over a packet network, and is not meant to limit the scope of the present invention. System 200 includes a packet network, or packet network 202 that allows participants A, B, and C to participate in a multimedia teleconference through, respectively, terminal 210, which has a clock 215 and accepts input from a camera 211 and a microphone 213, terminal 220, which has a clock 225 and accepts input from a camera 221 and a microphone 223, and terminal 270 which as a multimedia display unit 271. Packet network 202 also includes an ingress-mixer 230 having a clock 235, a synchronizer-egress 250, and a composer 260. Ingress-mixer 230 and egress-synchronizer 250 include programmable digital devices for processing data streams. In one embodiment of the present invention, carrier mediums 204 and 206 contain programming instructions for ingress-mixer 230 and synchronizer-egress 260, respectively, to execute the methods of the present invention, for example some or all of the instructions described with reference to the present invention.

Communications over packet network 202 is provided over any of a variety of wired and wireless connections that form the packet network, and that can be constantly changing with time, as is know in the art. Information is transmitted between devices on packet network 202 according to the addresses of individual devices. Specifically, audio and video is transmitted over packet network 202 in the form of sequential discrete packets of information, for example as MP3, G.711 or G.72x for audio and one of the MPEG standards or H.26x for video. The route of transmission is shown schematically in the Figures as lines of communication, for example as lines 217, 219, 227, 229, 231, 251, 253, 255, and 261 in FIG. 2A. One or more of these lines is shown passing through a packet network indicated as network 240. As shown in FIG. 2A, participants A and B provide audio and video content at terminals 210 and 220, respectively, which convert the content into streams of audio and video RTP packets for reception at terminal 270.

Figure 2A:
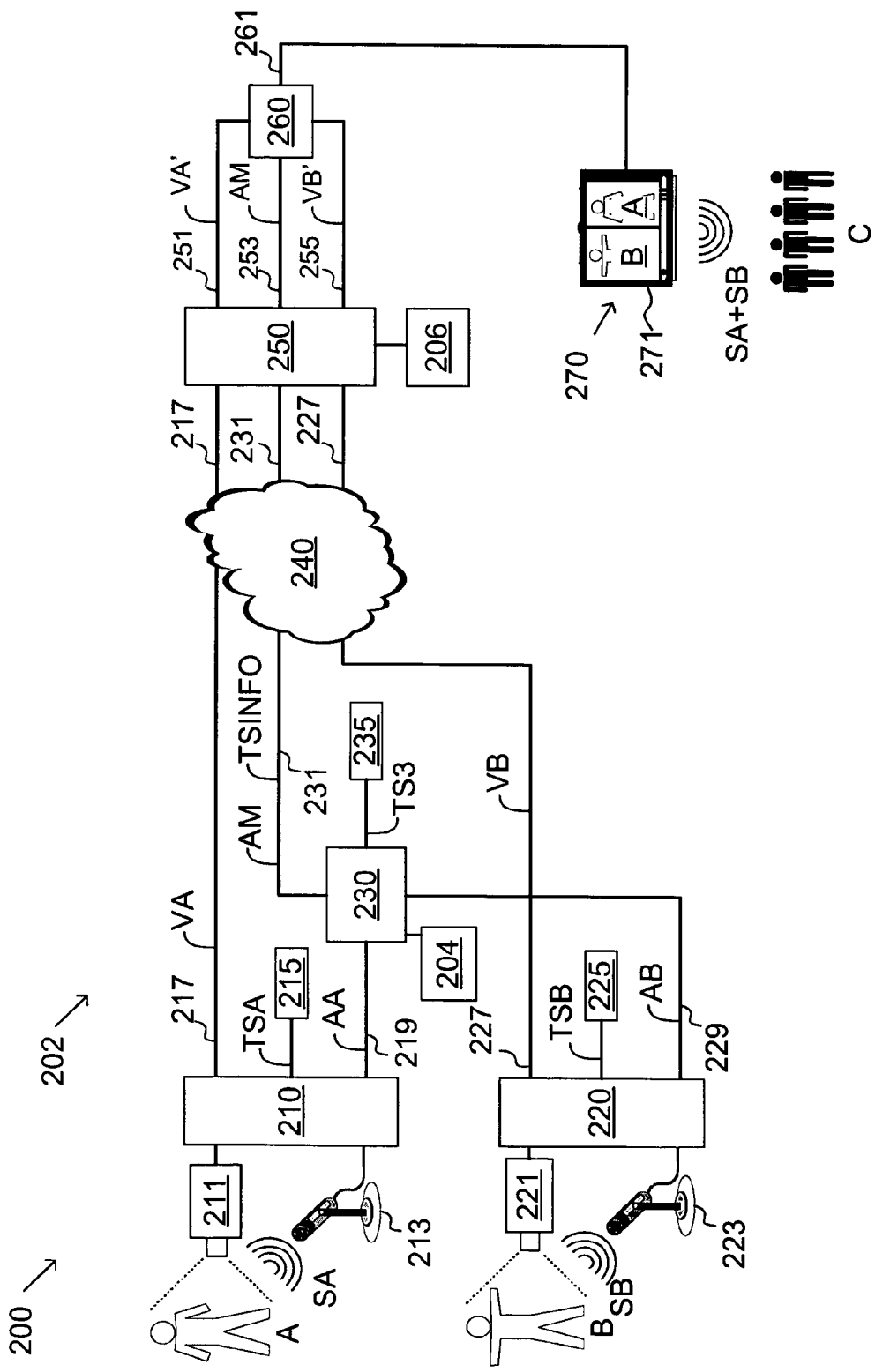
FIG. 2A is a multimedia teleconference system of the present invention.

In the embodiment of FIG. 2A, two participants A and B provide audio and video content to a third participant C. The audio and video streams from participant A are shown schematically as an audio stream AA and a video stream VA provided by terminal 210 that generates RTP packets timestamped according to clock 215. The audio and video streams from participant B are shown schematically as an audio stream AB and a video stream VB having packets timestamped according to clock 225. In general, clocks 215 and 225 are independent, and thus generate timestamps that allow synchronization of any audio and video pair from the same terminal (for example AA and VA or AB and VB).

Importantly, the connections between terminals 210 and 220 and ingress-mixer 230 is through a LAN or other high-speed connection. The audio and video signals from terminals 210 and 220 (AA, VA, AB, and VB) thus reach ingress-mixer 230 as inherently synchronized signals. The term "inherently synchronized" is used herein with reference to two or more signals, streams, or packets ("signals") at a point, such as a location in a network, where there is little or no difference in the delay time of the signals from their respective times of origin to the point of interest. Since each of the inherently synchronized signals arrives at a point in the same order that they were generated, they are synchronized without reference to an external clock. Another example of inherently synchronized signals are two video packets, where the first signal is from a video camera and where the second signal is from a computer generated text generator arrive at a video composer at corresponding times. Inherently synchronized packets can be combined without reference to an external clock. The term "ingress" or "ingress point" as used herein, is a position in a network that forms or generates timestamp information that can be used for synchronization of data streams. Thus, for example, if signals are to be combined, such as by audio mixing or video composing, information regarding the timestamps of the signals to be combined is formed or generated at the ingress point to provide for synchronization.

Audio streams AA and AB are thus processed in ingress-mixer 230 at a location in the network where they are inherently synchronized—that is both streams arrive at the mixer according to the time that they were generated, and thus can be combined by mixing to form a synchronized, mixed audio stream AM without reference to a common clock or the timestamps of the individual streams. Ingress-mixer 230 performs two functions—generating timestamp information and mixing. Specifically, ingress-mixer 230 performs the ingress function by forming timestamp information TSINFO that preserves information regarding the timestamps of the audio streams prior to mixing. In addition, ingress-mixer 230 performs the function of a mixer by combining the two audio streams. Since the streams from participant A (AA and VA) and the streams from participant B (AB and VB) both have synchronized timestamps, the information contained in timestamp information TSINFO allows for subsequent synchronizing the uncombined streams (VA and VB) with the mixed audio stream AM, as described subsequently.

Mixed audio stream AM, timestamp information TSINFO, and video streams VA and VB are then provided to a synchronizer-egress 250 that updates the video stream timestamps with timestamps that are synchronized with the mixed audio stream as synchronized video streams VA' and VB' and arranges the packets in chronological order. The term "egress" or "egress point," as used herein, is a position in a network where information regarding the timestamps of signals previously combined, such as by audio mixing or video composing, is removed from the network or is diverted so as not to propagate further in the network. It is preferred that timestamp information TSINFO is removed at an egress point because terminals, such as terminal 270 are not, in general, capable of receiving or interpreting TSINFO. Specifically, synchronizer-egress synchronizes video streams VA and VB with mixed audio stream AM according to current and/or previous timestamp information TSINFO, and removes timestamp information TSINFO from the network. The resulting synchronized video streams VA' and VB' and mixed audio stream AM are then provided to composer 260 for combining streams VA', VB', and AM.

At the receiving end, for example at terminal 270, the packets are reassembled in their original order and are decoded for play on audio-visual equipment, as described subsequently.

Figure 2B:
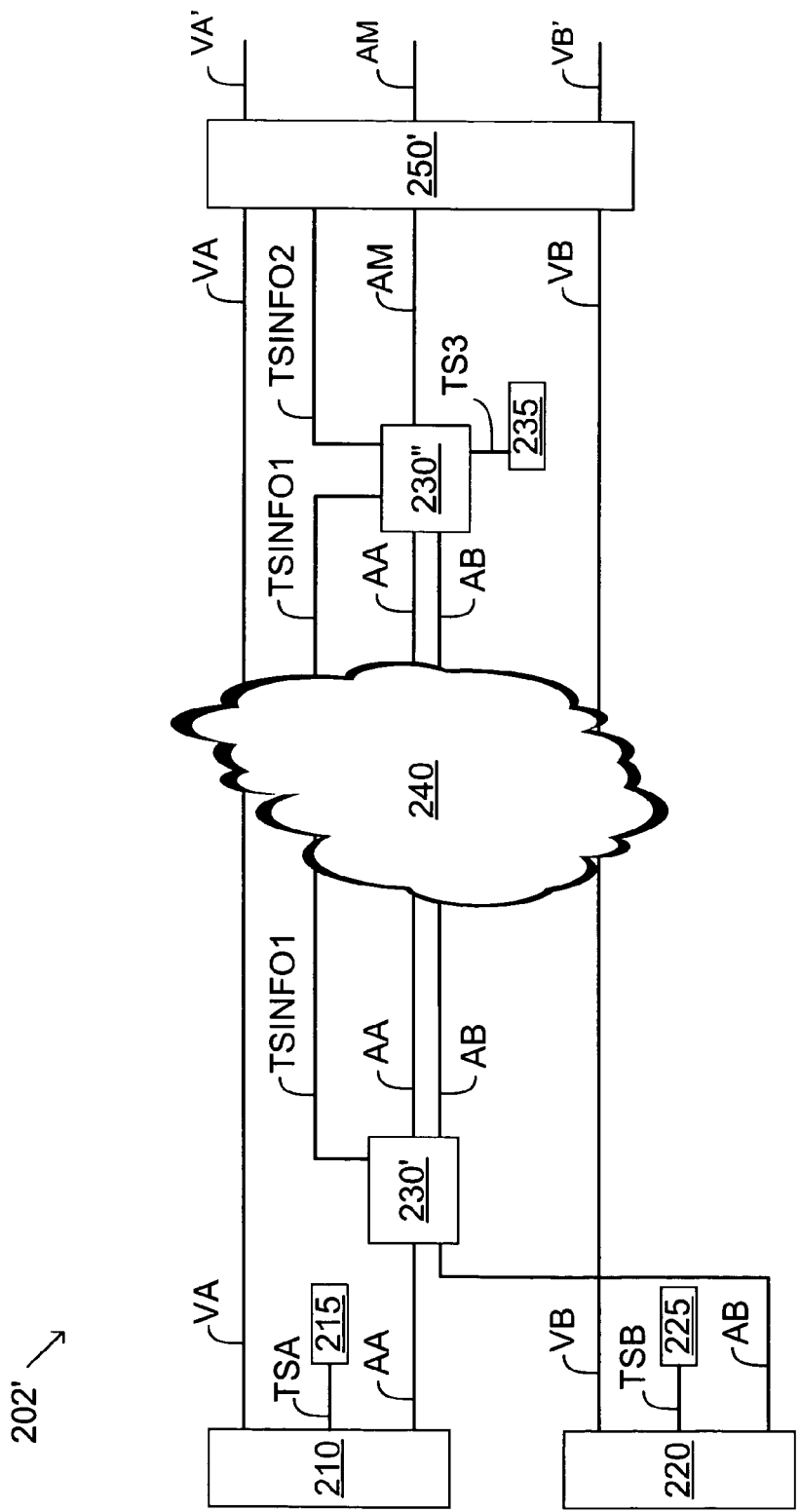
FIG. 2B is a multimedia teleconference system of the present invention where the ingress and mixing are separated across the network.

In general, the ingress and egress points may be at positions distant in a network (for example, connected through at least one WAN). An ingress point is located near each device sending information through the network (for example, connected to an input terminal through a LAN), and an egress point is located near a device receiving information (also, for example, connected to an output terminal though a LAN). Thus, in general, the synchronization of the ingress or egress may be separated across the network from other functions, such as mixing or composing. An alternative embodiment of the present invention wherein the timestamp formation of the ingress is performed separately from the mixer is shown in FIG. 2B as an alternative network 202', which is a portion of system 200 between terminals 210 and 220 and composer 260

(not shown). Network 202' has an ingress 230', a mixer 230", and a synchronizer-egress 250'. Ingress 230' monitors audio streams AA and AB and generates timestamp information TSINFO1, which contains information regarding the timestamps of audio streams AA and AB. Audio streams AA and AB and timestamp information TSINFO1 are then transmitted to mixer 230", which produces a mixed audio stream AM and a timestamp information TSINFO2 containing timestamp information from TSINFO1 and timestamp information regarding mixer clock 235. The resulting timestamp information TSINFO2 is then used in synchronizer-egress 250' to produce video streams VA' and VB' that are synchronized with mixed audio stream AM.

As described subsequently, timestamp information TSINFO is used, for example by a synchronizer, to mathematically manipulate timestamps downstream of the generation of TSINFO to synchronize streams. Timestamp information TSINFO is generated at the ingress point and is used at some point in the network to synchronize timestamps, for example as in synchronizer-egress 250. The generation and use of TSINFO is dependent on the form of the manipulation and how the information is transmitted from the ingress point to the point where synchronization of the timestamps occurs. Timestamp information TSINFO can include, but is not limited to, timestamps of the combined (mixed or composed) data streams at the time of combining and mathematical manipulations of the timestamps from which the relative timing of the streams can be determined, including but not limited to differences, sums, or ratios of timestamps. Timestamp information TSINFO can used to resynchronize the timestamps of the uncombined data streams where needed in the network, for example, by including the information within a part of the data packets or by communicating the information in separate data packets. The timestamp information can be used at points between the ingress and egress to synchronize signals.

System 200 will now be described in greater detail with reference to the embodiment of FIG. 2A. Terminal 210 accepts input from camera 211 and microphone 213, both trained on participant A, and generates a timestamp TSA from clock 215, Terminal 210 uses the accepted video input to generate timestamped video packets that are transmitted over line 217 in the form of video stream VA of RTP packets. The content of individual data packets of video stream VA includes a timestamp TSVA(i) from clock 215 and a payload of video data VA(i). Terminal 210 also accepts audio input to generate timestamped audio packets that are transmitted over line 219 in the form of audio stream AA of RTP packets. The content of individual packets of audio stream AA includes a timestamp TSAA(i) from clock 215 and a payload of audio data AA(i). The index "i" denotes sequential timestamps provided on audio stream AA and video stream VA by clock 215.

Likewise, terminal 220 accepts input from camera 221 and microphone 223, both trained on participant B, and accepts a timestamp TSB from clock 225. Terminal 220 uses the accepted video input to generate timestamped video packets that are transmitted over line 227 in the form of video stream VB of RTP packets each having a timestamp TSVB(j) from clock 225 and a payload of video data VB(j). The index "j" denotes sequential timestamps on audio stream AB and video stream VB by clock 225. Terminal 220 also accepts audio input to generate timestamped audio packets that are transmitted over line 229 in the form of audio stream AB of RTP packets each having a timestamp TSAB(j) from clock 225 and a payload of audio data AB(j).

Ingress-mixer 230 accepts timestamped audio data streams AA and AB over lines 219 and 229, combining the streams to form mixed audio stream AM having packets each having a timestamp TSAM(k) and mixed audio data AM(k). Timestamp TSAM(k) is provided by timestamp TS3 of clock 245, and may or may not be synchronized to either TSA or TSB. The index "k" denotes sequential timestamps on mixed audio stream AM. Thus, at a specific time, a packet of audio stream AA has a timestamp TSAA(i) and a packet of audio stream AB has a timestamp TSAB(j), and these two streams are combined and generate a packet having a timestamp TSAM(k).

In general, although the timestamps TSAA(i), TSAB(j), and TSAM(k) refer to an event that occurs at the same time, the timestamps are not identical, as noted previously. Ingress-mixer 230 preserves timestamp information TSINFO at the time of mixing from streams AA and AB that would otherwise be lost upon mixing. Streams VA, VB, AM, and timestamp information TSINFO are transmitted through packet network 202 to network egress point 241.

Video streams VA and VB and mixed audio stream AM arrive at synchronizer-egress 250 with timestamps generated by different clocks. Synchronizer-egress 250 receives timestamped video streams VA and VB, timestamped mixed audio stream AM, and timestamp information TSINFO. Synchronization of all of the audio and video streams is accomplished by adjusting the video timestamps in synchronizer 250. As is explained subsequently, synchronizer 250 uses information TSINFO to modify the timestamps of the video streams by updating the timestamps with timestamps synchronized with the mixed audio stream to form video streams VA' and VB' and then arranges the packets in chronological order. Thus, for example, a packet of video stream from participant A having a timestamp TSVA(i) is updated with a timestamp synchronized with the mixed audio as having a timestamp TSVAM(i). Composer 260 then accepts synchronized video streams VA' and VB' and mixed audio stream AM and combines the streams to a single audio stream and single video stream for display on a monitor 271 of terminal 270.

In summary, system 200 provides for synchronization of the video with the audio when combining inherently synchronized audio streams. Timestamp information TSINFO is generated at an ingress point at the time of mixing, and is later used to synchronize the video signals with the mixed audio signal and removed from the network at the egress point. In general, timestamp information TSINFO can be generated at any point where the two audio streams are inherently synchronized, for example at a common terminal or another location in the network where there is negligible delay in transport of packets from their generation.

In further alternative embodiments of the present invention, timestamp information TSINFO is generated at some other location between terminals 210 and 220 and ingress-mixer 230, or though communication between terminals 210 and 220, and is provided separately to synchronizer-egress 250. Thus, for example, the video streams can be supplied to a device that mixes the audio and synchronizes the video timestamps. Subsequent combining of the audio and video streams then can occur at any location in the network. Synchronizer-egress 250 can likewise be alternatively located at other positions in the network, for example as part of composer 260.

Derivation of General Timestamp Updating Equations

Before considering specific embodiments of the present invention, it is instructive to consider equations used to provide timestamps for synchronization. In general, the present invention allows for synchronization of streams generated using different clocks by calculations involving timestamps.

Figure 3A:
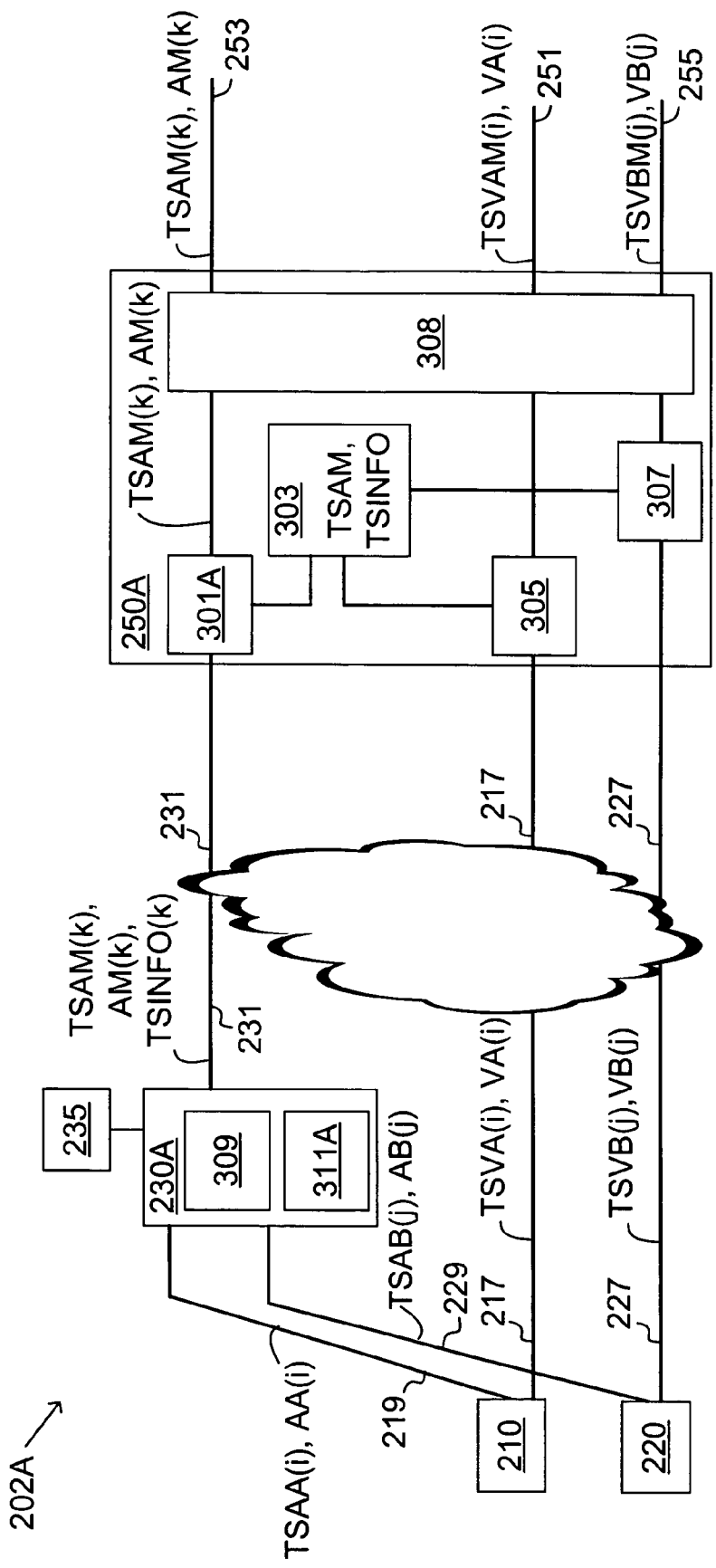
FIG. 3A is a schematic of a first embodiment synchronizing packet network of the present invention.
Figure 3B:
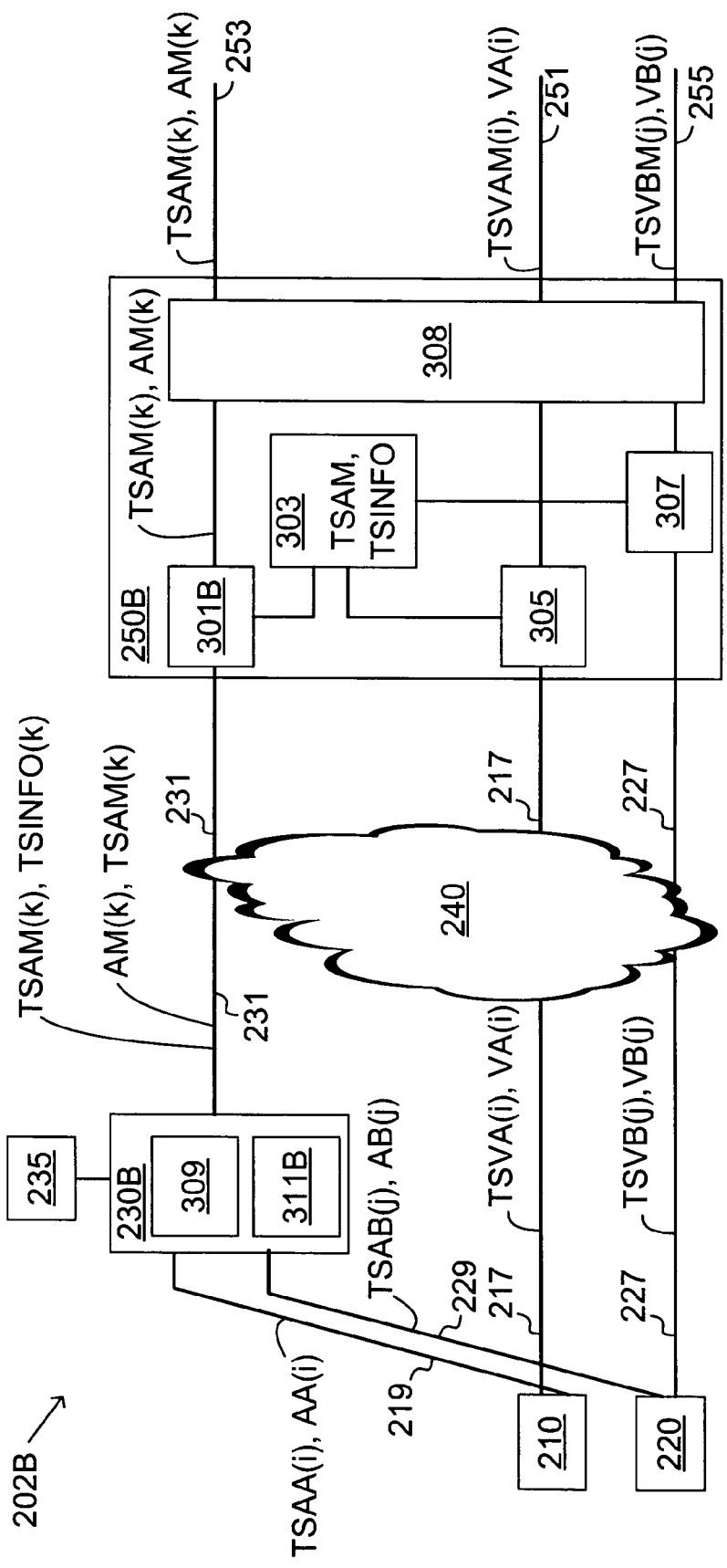
FIG. 3B is a schematic of a second embodiment synchronizing packet network of the present invention.

As one example of the present invention, consider the audio mixing and video composing of FIGS. 2A and 3B. In prior art systems, the audio and video from each terminal have different timestamps. The prior art audio mixing does not preserve the audio timestamps of the original audio streams, thus making it difficult to compose the video or to combine the mixed audio with either of the video streams without reference to a network time. In the embodiments of the present invention information related to the original audio timestamps to later synchronize the mixed audio and the video. Thus, for example, if streams are combined from two terminals, for example, the audio streams are mixed, then the present invention can provide updated timestamps for the two video streams to achieve synchronization.

Although not limited to the formulas derived herein, several embodiment of the present invention use these formulas to provide synchronization. Consider, for example, the case where packets occurring at different times are timestamped according to clocks operating at different, constant speeds as follows:

$$Txi = Ti*Fx + Cx,$$

where Txi is the timestamp for an event in a stream occurring at a time Ti as measured by a "global time", Fx is a constant clock rate at location or stamping device X, and Cx is a constant related to the timestamp starting point. The time Ti is some absolute network time standard that serves in this derivation as a time reference.

Assume there are two locations A and M, each having a free-running clock with a constant frequency, specifically Fa and Fm and constants Ca and Cm. A same time, but two different places sampling will result two different time stamps. The time stamp in each location generated can be described by the following equations:

$$Tai = Ti*Fa + Ca, \text{ and}$$

$$Tmi = Ti*Fm + Cm,$$

where Tai and Tmi is the time stamp for an event (at time Ti) generated by two different clocks (A and M).

A manipulation of the above equations for two or more different events each timestamped with different clocks allows for the calculation of events at other times and/or events timestamped with one of the clocks. Thus for example, consider three separate events ("1," "2," and "3") timestamped at location A using clock A and at location M using clock M. As an example that will be useful herein, "A" can represent the timestamping of data streams by one clock, for example each audio and video from the same participant, such as streams AA and VA, and "M" can represent the timestamping of stream AM. Letting "i" in the above be replaced with i=1, 2, and 3, representing timestamps for three different events, occurring at times T1, T2, and T3 gives:

$$Ta1 = T1*Fa + Ca, \tag{1}$$

$$Ta2 = T2*Fa + Ca, \tag{2}$$

$$Ta3 = T3*Fa + Ca. \tag{3}$$

$$Tm1 = T1*Fm + Cm, \tag{4}$$

$$Tm2 = T2*Fm + Cm, \text{ and} \tag{5}$$

$$Tm3 = T3*Fm + Cm, \tag{6}$$

Solving for the F's and C's using Equations (1) and (2) and Equations (4), and (5) gives:

$$Fa = (Ta2 - Ta1)/(T2 - T1), \text{ and} \tag{7}$$

$$Ca = (Ta1*T2 - Ta2*T1)/(T2 - T1), \tag{8}$$

and $$Fm = (Tm2 - Tm1)/(T2 - T1), \text{ and} \tag{9}$$

$$Cm = (Tam1*T2 - Tm2*T1)/(T2 - T1). \tag{10}$$

Solving for the global time T3 using Equations (3), (7) and (8) gives:

$$T3 = (Ta3 - Ca)/Fa = \frac{Ta3 - \dfrac{Ta1*T2 - Ta2*T1}{T2 - T1}}{\dfrac{Ta2 - Ta1}{T2 - T1}} \tag{11}$$

$$= \frac{Ta3*(T2 - T1) - Ta1*T2 - Ta2*T1}{Ta2 - Ta1},$$

The timestamp m of event 3 (Tm3) in terms of the other timestamps is obtained by combining Equations (6), (9), (10), and (11) as:

$$Tm3 = T3*Fm + Cm = \frac{Ta3*(T2-T1) - (Ta1*T2 - Ta2*T1)}{Ta2 - Ta1} * \frac{(Tm2 - Tm1)}{T2 - T1} + \frac{Tm1*T2 - Tm2*T1}{T2 - T1}$$

$$= Ta3 + \frac{Tm1*Ta2 - Tm2*Ta1}{Ta2 - Ta1} \tag{12}$$

Letting δa be the difference between the two timestamps from clock A and δm be the difference between the two timestamps from clock M results in Ta2=Ta1+δa and Tm2=Tm1+δm, and Equation (12) becomes:

$$Tm3 = Ta3 + Tm1 - Ta1 * \frac{\delta m}{\delta a}, \text{ and} \tag{13}$$

Equations (7) and (9), along with the definitions of δa and δm, give:

$$\delta m/\delta a = Fm/Fa \tag{14}$$

The above equations they relate the timestamp from one clock with the timestamps to other clocks, and provide a method for synchronizing differently stamped streams. In particular, Equations (12), (13), or (14) can be used to generate timestamp information and use that information to synchronize differently stamped streams. Different embodiments of the invention use these Equations along with timestamps or the ratio δm/δa to determine the timestamp at one location from the timestamp at a second location.

While the following method of synchronizing streams is illustrated in terms of the specific example of combining audio and video streams, it will become apparent to those skilled in the art that the description that follows is applicable to the synchronizing of streams from that use different clocks.

Application of Timestamp Updating Equations to Specific Embodiments

Figure 4A:
FIG. 4A is a first embodiment RTP packet from a mixer containing mixed audio and timestamp information.
Figure 4B:
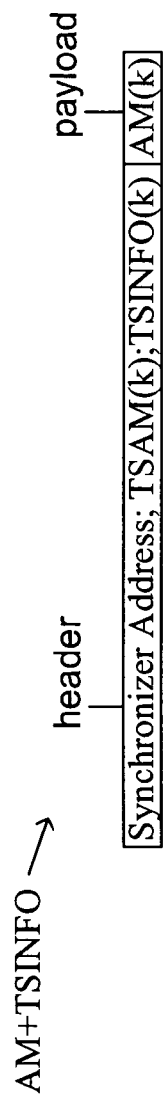
FIG. 4B is a second embodiment RTP packet from a mixer containing mixed audio and timestamp information.

The use of the above equations will be used to illustrate specific embodiments of the present invention without limiting the scope of the present invention. FIG. 3A is a schematic of a first embodiment synchronizing packet network 202A of the present invention for implementing the system of FIG. 2A, including an ingress-mixer 230A having an ingress 311A and a mixer 309, and a synchronizer-egress 250A having a timestamp stripper 301A, a timestamp memory 303, a video A synchronizer 305, a video B synchronizer 307, and a synchronization buffer 308. FIGS. 4A and 4B illustrate two RTP packet embodiments AM+TSINFO, and FIGS. 5A and 5B, are flow charts of steps performed by ingress-mixer 230A and synchronizer-egress 250A, respectively.

Figure 5A:
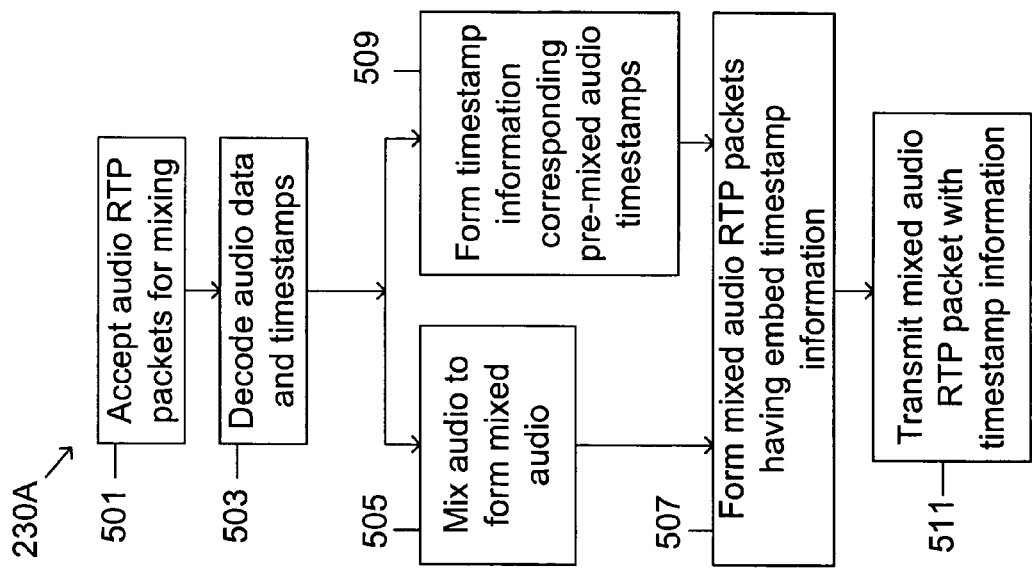
FIG. 5A is a flowchart of the steps performed by the ingress-mixer of the first embodiment synchronizing packet network.
Figure 5B:
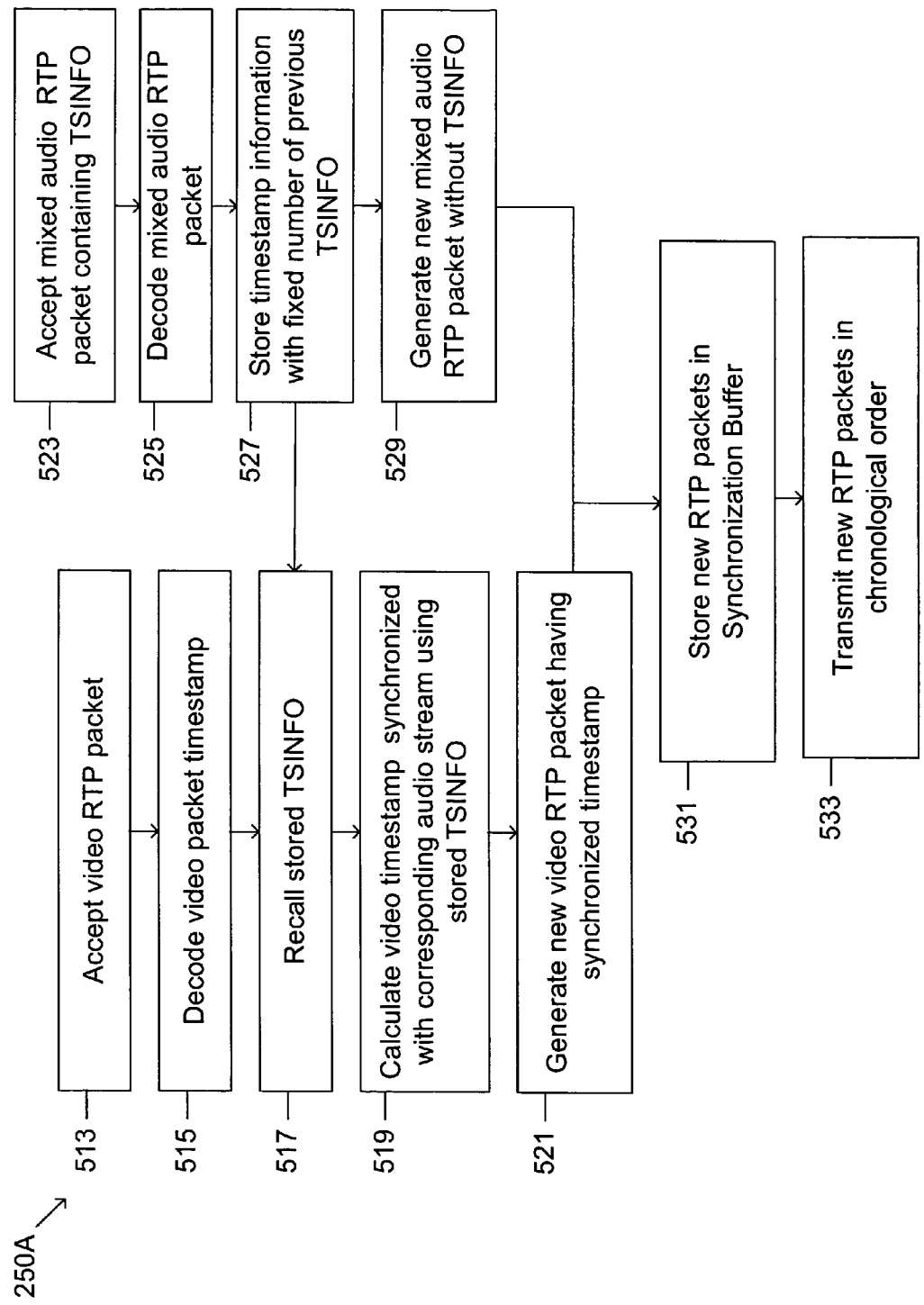
FIG. 5B is a flowchart of the steps performed by the synchronizer-egress of the first embodiment synchronizing packet network.

The operation of packet network 202A in updating video streams VA and VB with timestamps synchronized with mixed audio stream AM is illustrated in the flowcharts of FIGS. 5A and 5B. RTP packets containing audio from streams AA and AB are accepted by ingress-mixer 230A (block 501). Each packet is decoded to determine the timestamp and audio data (block 503). The audio information from each packet is mixed, as is known in the art, by mixer 309 (block 505), and the timestamp information from each packet is processed by ingress 311A to generate timestamp information TSINFO (block 509). More specifically, the information contained in TSINFO is the current timestamp of each of the audio streams being mixed—TSAA(i) and TSAB(j). The mixed audio of block 505 and the timestamp information of block 509 are then used to form a mixed audio RTP packet having embedded timestamp information (block 507). This packet is then transmitted (block 511) over packet network 202A to synchronizer-egress 250.

Two examples of embodiments of RTP packets forming stream AM+TSINFO are shown schematically in FIGS. 4A and 4B. In the first embodiment RTP packet of stream AM+TSINFO (FIG. 4A), each packet has a header that includes the IP address of synchronizer 250A and timestamp TSAM(k) of the mixed audio data packet, and a payload that includes timestamp information TSINFO(k) and mixed audio data AM(k). In the second embodiment RTP packet forming stream AM+TSINFO (FIG. 4B), each packet has a header that includes the IP address of synchronizer 250A, timestamp TSAM(k), and timestamp information TSINFO(k), and a payload having mixed audio data AM(k). It is understood that the illustrated packets highlight information of particular importance to the present invention, and that the header and payload of each packet may contain other information. In either case, each packet AM+TSINFO of first embodiment synchronizing packet network 202A encapsulate mixed audio data AM(k), TSAA(i) and TSAB(j), as well as TSAM(k)—that is the timestamp of each audio packet prior to and after mixing.

As illustrated in the flowchart of FIG. 5B, video streams VA and VB and stream AM+TSINFO are received in synchronizer-egress 250A. A mixed audio RTP packet having timestamp information TSINFO is accepted (block 523). Timestamp information stripper 301A decodes the accepted mixed audio timestamp (block 525) and provides TSAM(k) and corresponding timestamp information TSINFO(k), as TSAA(i) and TSAB(j), from timestamp information TSINFO to memory 303 (block 527). Timestamp stripper 301A also removes timestamp information from the RTP packets by generating new mixed audio RTP packets that do not contain TSINFO (block 529).

Synchronizer-egress 250A also includes video synchronizers 305 and 307 to receive video streams VA and VB, respectively, and receive stored timestamp information from memory 303 to update the video streams with synchronized timestamps. More specifically, synchronization of the video streams is performed as indicated in FIG. 5B, where a new video RTP packet, VA or VB, is accepted into video A synchronizer 305 or video B synchronizer 307, respectively (block 513). Within the video synchronizer 305 and 307 the corresponding video packet is decoded (block 515), the previously stored timestamp information (TSAA's, TSAB's and TSAM's) is retrieved from memory 303 (block 517), the calculation of an updated video timestamp TSVAM(i) or TSVBM(j) for streams VA and VB, respectively, is performed using the retrieved information and the current video stream timestamp (block 519), and a new video packet having the updated timestamp is generated (block 521).

The new mixed audio and video packets provided by blocks 529 and 521, respectively, are stored in synchronization buffer 308 (block 531), and are transmitted over the packet network (block 533) in sequential order to composer 260 for further processing.

In general, there are many relationships that can be formed between the current video timestamps TSVA(i) and TSVB(j) and timestamp information TSINFO to update video timestamps TSVAM(i) or TSVBM(j). A few of the relationships are derived above as Equations (12), (13), and (14). The following embodiment is one method for updating the video timestamps.

In network 202, memory 303 includes the previous two processed audio timestamps, and thus includes the recently received corresponding timestamps TSAA(i'), TSAB(j'), and TSAM(k'), and the older corresponding timestamps TSAA(i''), TSAB(j''), and TSAM(k''). The current video A stream packet has a timestamp TSAV(i) that is synchronized with stream AA (timestamp TSAA). Equations (12) and (13) can be used to provide updated video timestamps as follows. Letting Ta1=TSAA(i''), Ta2=TSAA(i'), Tm1=TSAM(k''), Tm2=TSAM(k'), Ta3=TSAV(i), the video timestamp synchronized with the mixed audio timestamp, Tm3=TSVAM(i), is given from Equation (12) as:

$$TSVAM(i) = TSAV(i) + \frac{TSAM(k'') * TSAA(i') - TSAM(k') * TSAA(i'')}{TSAA(i') - TSAA(i'')}. \quad (15)$$

the timestamp for video stream B (VB) is obtained by substituting "B" for "A" in Equation (15):

$$TSVBM(j) = \quad (16)$$
$$TSBV(j) + \frac{TSAM(k'') * TSAB(j') - TSAM(k') * TSAB(j'')}{TSAB(j') - TSAB(j'')}.$$

The replacement of the video timestamps according to Equations (15) and (16) synchronizes the video timestamps with the mixed audio timestamp clock. Note that Equations (15)

and (16) require two previous audio timestamps, and thus two processed timestamp information packets are required to synchronize the audio and video.

In an alternative synchronization method, if the frequencies of the timestamp clocks are approximately equal, then Fa/Fm=δa/δm=1, and Equation (13) can be used to synchronize timestamps with only one stored timestamp information as follows:

$$TSVAM(i)=TSAV(i)+TSAM(i')-TSAA(i'), \text{ and} \quad (17)$$

the timestamp for video stream B (VB) is obtained by substituting "B" for "A" in Equation (15):

$$TSVBM(j)=TSBV(j)+TSAM(i')-TSAA(i'). \quad (18)$$

Figure 4C:
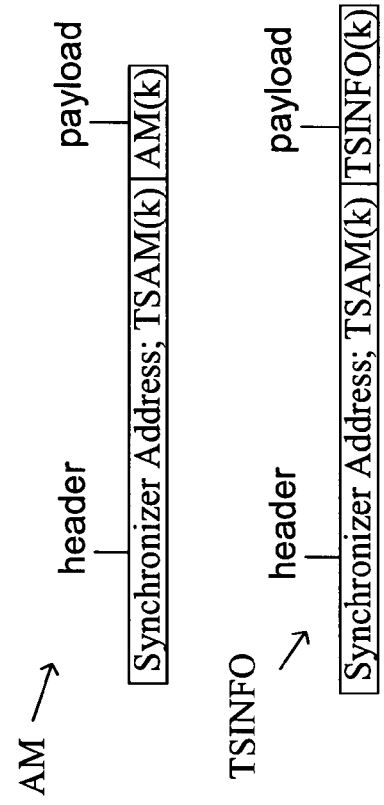
FIG. 4C are third embodiment RTP packets from a mixer as separate mixed audio and timestamp packets.

A second embodiment synchronizing packet network is illustrated in the FIG. 3B as a schematic of network 202B of the present invention including an ingress-mixer 230B having an ingress 311B and a mixer 309, and a corresponding synchronizer-egress 250B having a timestamp stripper 301B, a timestamp memory 303, a video A synchronizer 305, a video B synchronizer 307, and a synchronization buffer 308. FIG. 4C illustrates an RTP packet embodiments, and FIGS. 6A and 6B, are flow charts of steps performed by ingress-mixer 230B and synchronizer-egress 250B, respectively.

The embodiment of FIG. 3B differs from that of FIG. 3A in that timestamp information TSINFO is sent in packets different than the AM data. Thus, for example, the data packets shown in FIG. 4C include shows as a mixed audio RTP packet AM and a separate timestamp information RTP packet TSINFO. Both AM and TSINFO packets are sent from the ingress point to the egress point, as explained subsequently. In an alternative embodiment of the data packets of FIG. 4C, AM is sent as a RTP packet and TSINFO is sent as an RTCP packet.

Figure 6A:
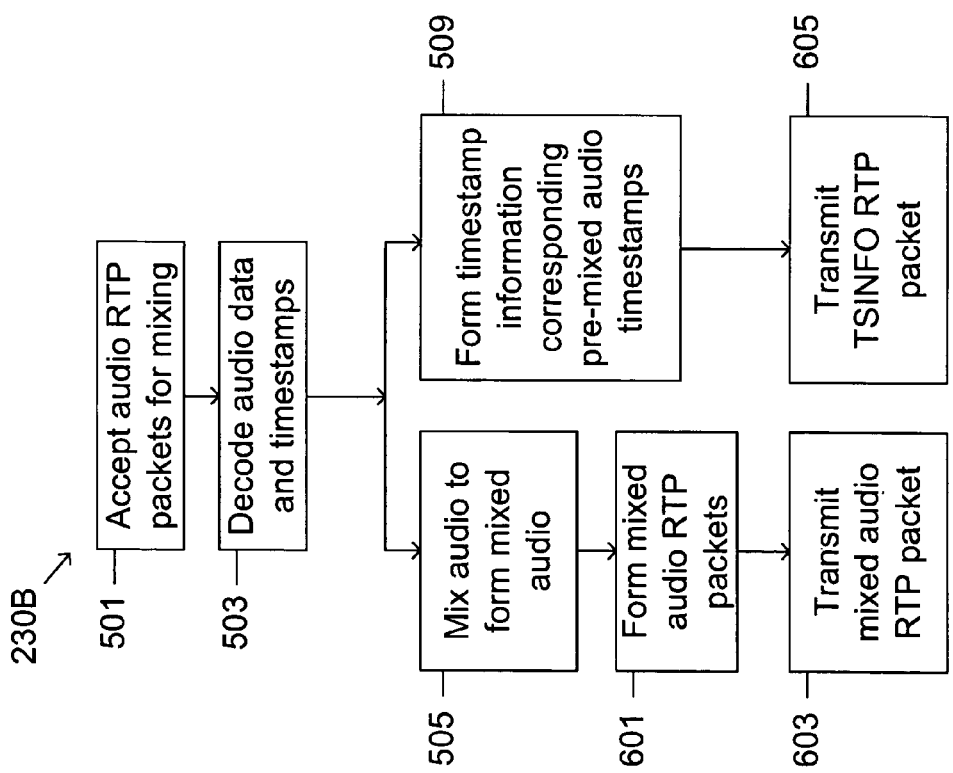
FIG. 6A is a flowchart of the steps performed by the ingress-mixer of the second embodiment synchronizing packet network.
Figure 6B:
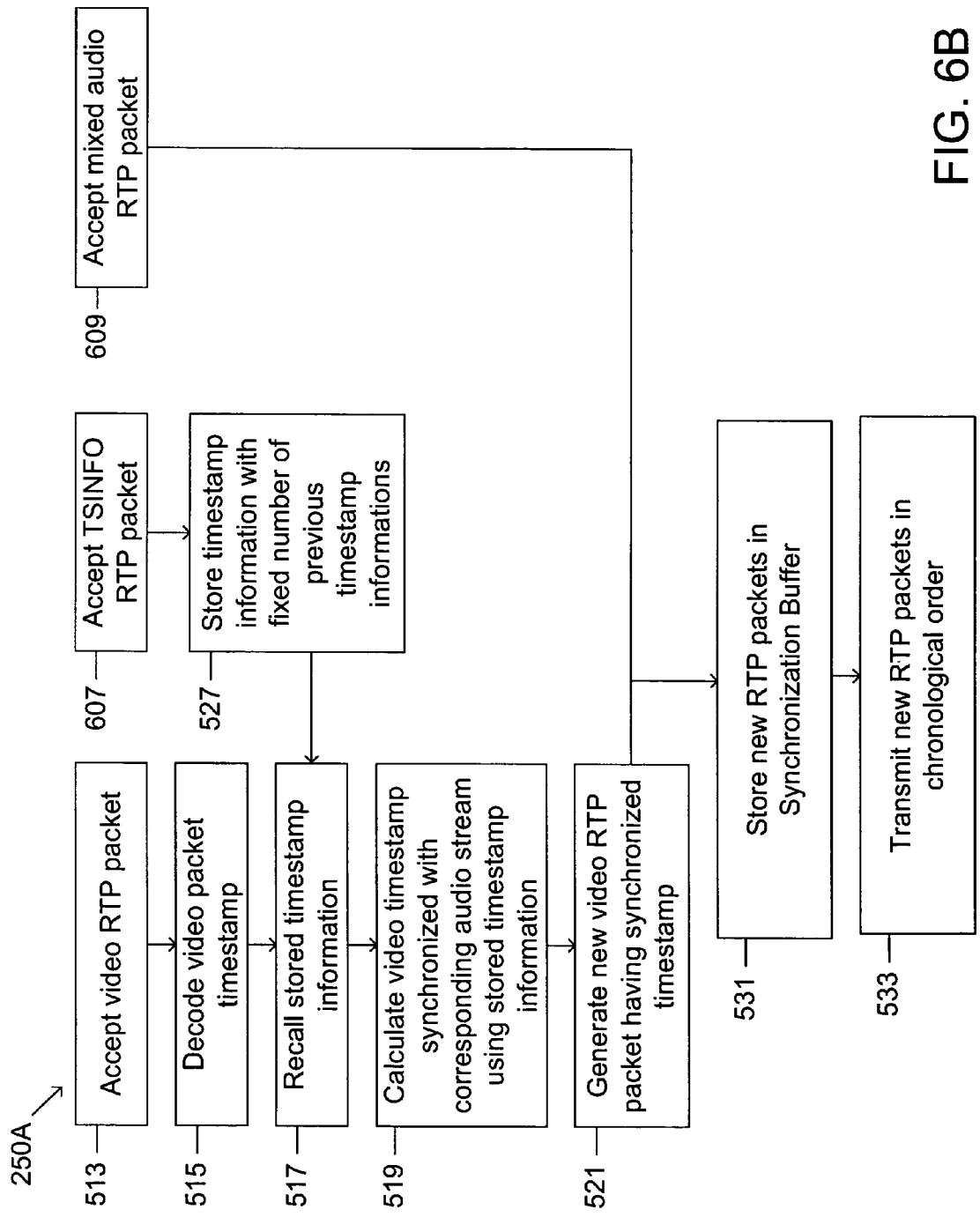
FIG. 6B is a flowchart of the steps performed by the synchronizer-egress of the second embodiment synchronizing packet network.

The operation of packet network 202B in updating video streams VA and VB with timestamps synchronized with mixed audio stream AM is illustrated in the flowcharts of FIGS. 6A and 6B. RTP packets containing audio from streams AA and AB are accepted by ingress-mixer 230B (block 501). Each audio packet is decoded to determine the timestamp and audio data (block 503). The audio data is mixed by mixer 309 (block 505), mixed audio RTP packets are formed (block 601), and are then transmitted (block 603) over packet network 202B to synchronizer-egress 250B. The timestamp information from each packet is processed by ingress 311B to generate timestamp information TSINFO (block 509), which receives a timestamp as is transmitted (block 605) over packet network 202B to synchronizer-egress 250B.

Video streams VA and VB, mixed audio stream AM, and timestamp information TSINFO are then received separately in synchronizer 250B, whose operation is illustrated in the flow chart of FIG. 6B. The video processing portion (blocks 305 and 307), synchronization buffer (block 308) and timestamp memory (block 303) are functionally the same as those blocks of FIG. 5B. The mixed audio stream AM and timestamp information TSINFO are received by timestamp stripper 301B in blocks 609 and 607, respectively. Timestamp stripper provides RTP packets with TSINFO to timestamp memory 303 (block 527) and provides mixed audio AM to synchronization buffer 308 (block 531). Synchronization of the video is performed using the same steps as network 202A.

Figure 7:
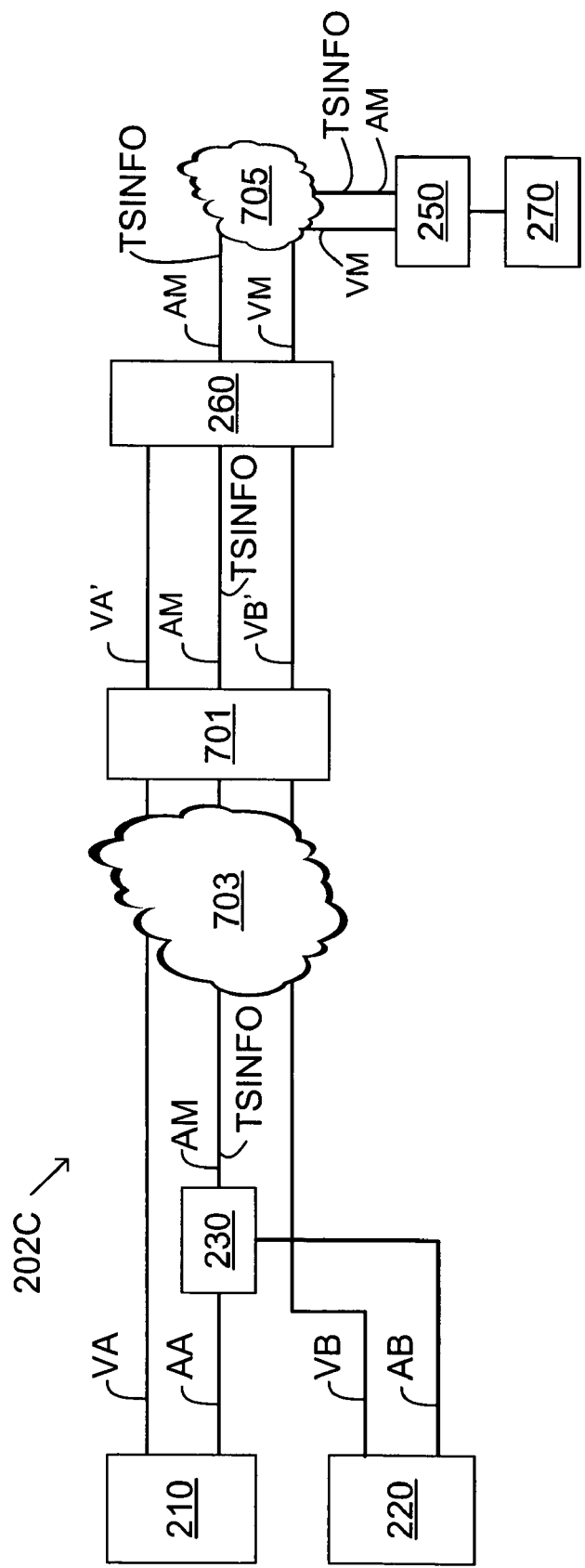
FIG. 7 is a schematic of a third embodiment synchronizing packet network of the present invention
Figure 8:
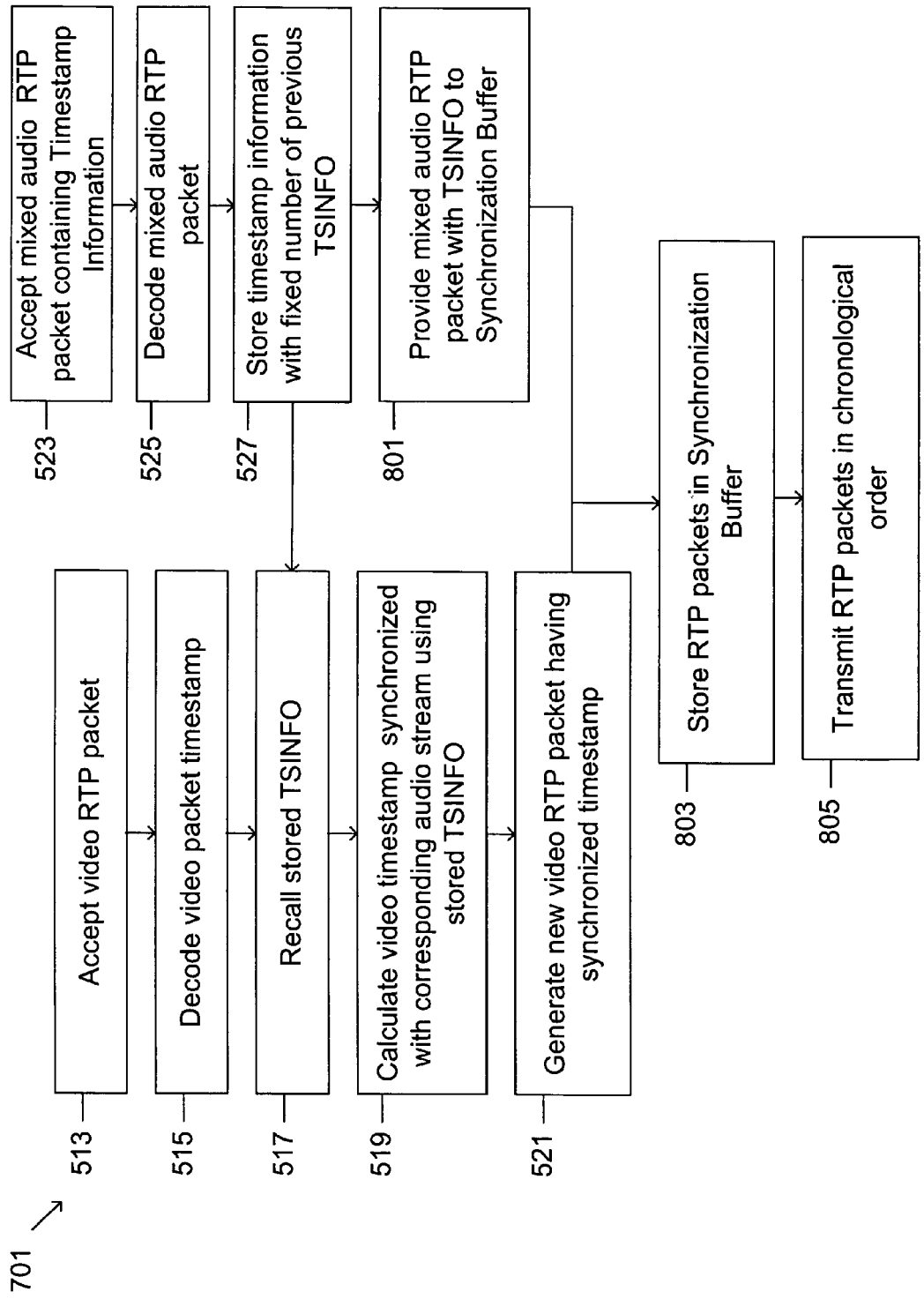
FIG. 8 is a flowchart of the steps performed by the synchronizer of the third embodiment synchronizing packet network.

FIG. 7 is a schematic of a third embodiment synchronizing packet network 202C in which synchronization occurs separately from egress. Network 202C has terminals 210 and 220 and ingress-mixer 230 connected through a first WAN network 703 to a synchronizer 701, whose operation is shown in the flowchart of FIG. 8, and a composer 260, and further connected through a second WAN network 705 to a synchronizer-egress 250 to a terminal 270.

Network 202C illustrates the use of timestamp information TSINFO at different network locations. In particular, the operation of synchronizer 701 is similar to synchronizer-egress 250, except that it does not perform the egress function of removing of timestamp information. As shown in FIG. 8, synchronizer 701 includes a block 801 the provides mixed audio RTP packets without stripping TSINFO, since TSINFO is required by synchronizer-egress 250 to synchronize the streams after leaving second network 705. Synchronizer 701 also includes the steps of storing the updated video and mixed audio packets in a Synchronization Buffer (block 803) and then transmitting the packets in order (block 805).

Figure 9:
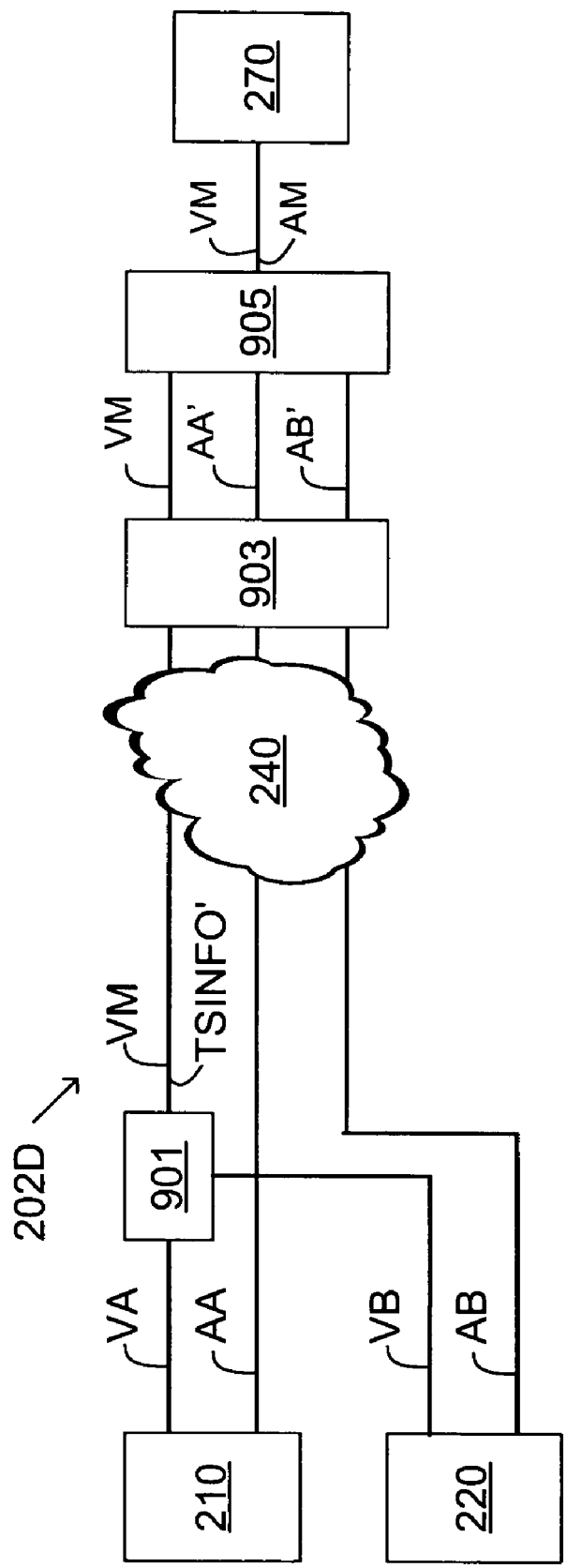
FIG. 9 is a schematic of a fourth embodiment synchronizing packet network of the present invention.
Figure 10A:
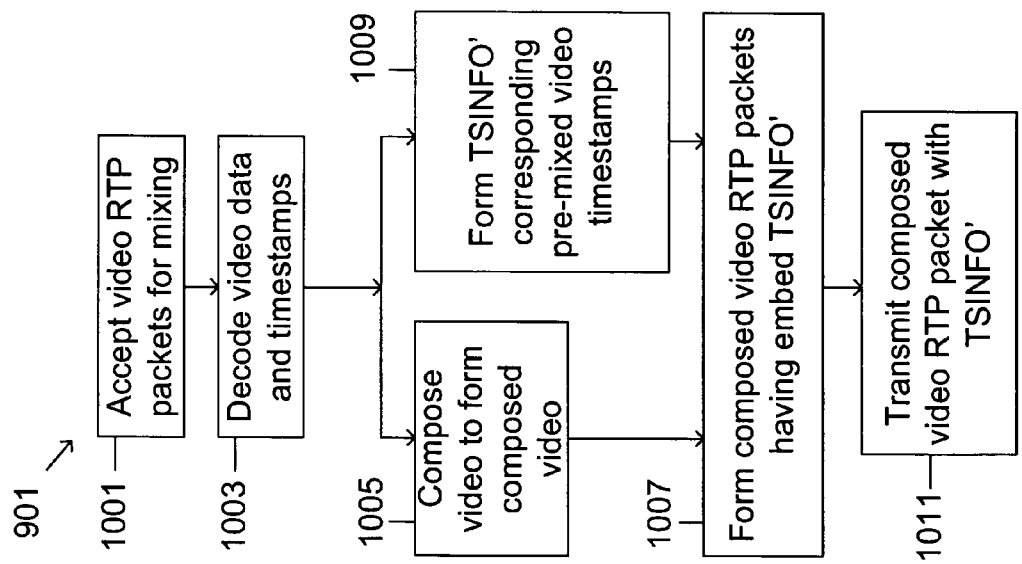
FIG. 10A is a flowchart of the steps performed by the composer of the fourth embodiment synchronizing packet network.

FIG. 9 is a schematic of a fourth embodiment synchronizing packet network 202D in which inherently video signals are composed first. Network 202D has terminals 210 and 220 and ingress-composer 901 connected through a network 240 to a synchronizer-egress 903, followed by a mixer 905, to a terminal 270. The operation of ingress-composer 901 is shown in the flowchart of FIG. 10A, and the operation of synchronizer-egress 903 is shown in FIG. 10B.

The operation of network 202D is similar to that of the previous networks, with the video being combined first. Specifically, network 202D updates audio streams AA and AB with timestamps synchronized with composed video stream VM. RTP packets containing video from streams VA and VB are accepted by ingress-composer 901 (block 1001). Each packet is decoded to determine the timestamp and video data (block 1003). The video information from each packet is composed by ingress-composer 901 (block 1005), and the timestamp information from each packet is processed by ingress-composer 901 to generate timestamp information TSINFO' (block 1009). More specifically, the information contained in TSINFO' is the current timestamp of each of the video streams being composed—TSVA(i) and TSVB(j). The composed audio of block 1005 and the timestamp information of block 1009 are then used to form a composed video RTP packet having embedded timestamp information (block 1007). This packet is then transmitted (block 1011) over packet network 202D to synchronizer-egress 903.

Figure 10B:
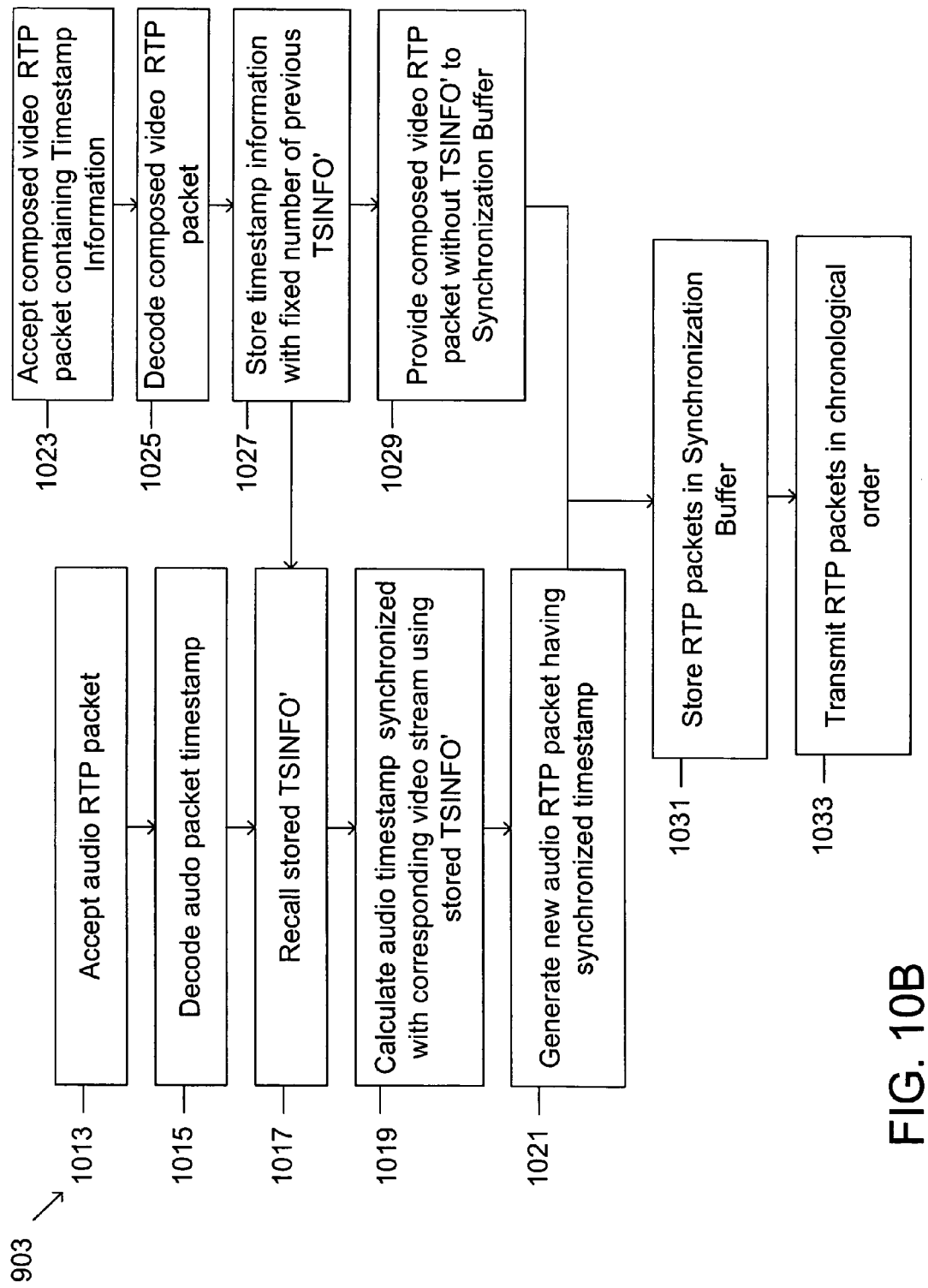
FIG. 10B is a flowchart of the steps performed by the synchronizer-egress of the fourth embodiment synchronizing packet network.

As illustrated in the flowchart of FIG. 10B, audio streams AA and AB and streams VM and TSINFO' are received in synchronizer-egress 903. A composed video RTP packet having timestamp information TSINFO' is accepted (block 1023), decoded (block 1025) and stored in memory (block 1027). A new composed video RTP packets without TSINFO' is then stored in a synchronization buffer (block 1029).

Synchronizer-egress 250A also accepts audio streams AA and AB, respectively, (block 1013), and decodes the audio streams (block 1015). The stored TSINFO' is then retrieved (block 1017), and the timestamps of each audio stream corresponding to the timestamp of the video of the composed video stream is then calculated (block 1019), and new audio RTP packets with the updated timestamps are generated (block 1021). The timestamps of audio streams AA and AB are updated with timestamps TSAAM(i) and TSABM(j) to form streams AA' and AB', respectively.

The composed video and audio packets provided by blocks 1029 and 1021, are then stored in a synchronization buffer (block 1031), and are transmitted in sequential order over the packet network (block 1033) to mixer 905 for further processing.

Any of the previous formulations for updating the video timestamps when mixing is performed first can be applied to updating the audio timestamps when composing is performed first. As one example of TSINFO' for use in network 202D, Equations similar to Equations (15) and (16) can be derived for the generation of updated audio timestamps using information at the time of composing. Thus, for example, TSINFO' is generated at ingress-composer 901 and includes TSVA(i'), TSVB(j'), TSVM(k'). The updated timestamp for audio stream A is:

$$TSAAM(i) = \qquad (15')$$
$$TSAA(i) + \frac{TSVM(k'') * TSVA(i') - TSVM(k') * TSVA(i'')}{TSVA(i') - TSVA(i'')}, \text{ and}$$

the updated timestamp for video stream B (VB) is:

$$TSABM(j) = \qquad (16')$$
$$TSAB(j) + \frac{TSVM(k'') * TSVB(j') - TSVM(k') * TSVB(j'')}{TSVB(j') - TSVB(j'')}$$

Alternatively, the information used in synchronizing the timestamps is used to synchronize streams without updating the timestamps. Thus, for example, the timestamp information TSINFO can be used to determine a "virtual timestamp" that is used, by software within synchronizer-egress 250, to provide the appropriate delay of the streams being sent synchronized data streams to terminal 270.

Another alternative embodiment of the present invention that can be used with any of the previous embodiments is a timestamp information TSINFO that includes timestamp clock frequency information. Specifically, for cases where the audio is mixed first, alternative timestamp information TSINFO is generated at ingress-mixer 230 and includes TSSA(i'), TSAB(j'), TSAM(k') and frequency information fa(i) and fb(j) calculated from Equation (14), specifically as $fa(i)=Fm/Fa=\delta m/\delta a=(TSAM(k)-TSAM(k-1))/((TSAA(i)-TSAA(i-1)),$ and $fb(j)=Fm/Fb=\delta m/\delta b=(TSAM(k)-TSAM(k-1))/((TSAB(j)-TSAB(j-1)),$ \qquad (19)

Thus, for example, ingress-mixer 230 includes memory, such as memory 309 shown in FIG. 3A, that stores one previous set of corresponding timestamps, for example, as TSAM(k-1), TSAA(i-1), and TSAB(j-1). When data of the next audio stream in processed, the current values of timestamps TSAM(k), TSAA(i), and TSAB(j) are used with Equation (18) to calculate fa(i) and fb(j), which are included with timestamps TSAM(k), TSAA(i), and TSAB(j) as part of alternative timestamp information TSINFO.

Equations (13) and (19) can be used to synchronize the video timestamps to the mixed audio timestamps as follows:

$TSVAM(i)=TSAV(i)+TSAM(k')-TSAA(i')*fa(i),$ and $TSVBM(j)=TSBV(j)+TSAM(k')-TSAB(j')*fb(j).$ \qquad (20)

Alternatively, timestamp information TSINFO including the delay between timestamps (that is, timestamp differences) can be used in any of the previous network embodiments. Thus, for example, one embodiment TSINFO is one of the timestamps and the difference in the timestamp between two timestamping terminals, such as terminal 210 and 220, such as TSAA(i) and ΔT=TSAA(i)-TSAB(j). This TSINFO can be used, for example at synchronizer-egress 250 to provide the same update information as is provided by a TSINFO comprising both audio timestamps.

The above equations, in conjunction with TSINFO can be used to replace timestamps with original timestamp information. Thus for example, if a data stream and TSINFO passes through a timestamping device, the information from TSINFO can be used, either by the device or by a subsequent device, to provide data packet with the original timestamp.

Figure 11:
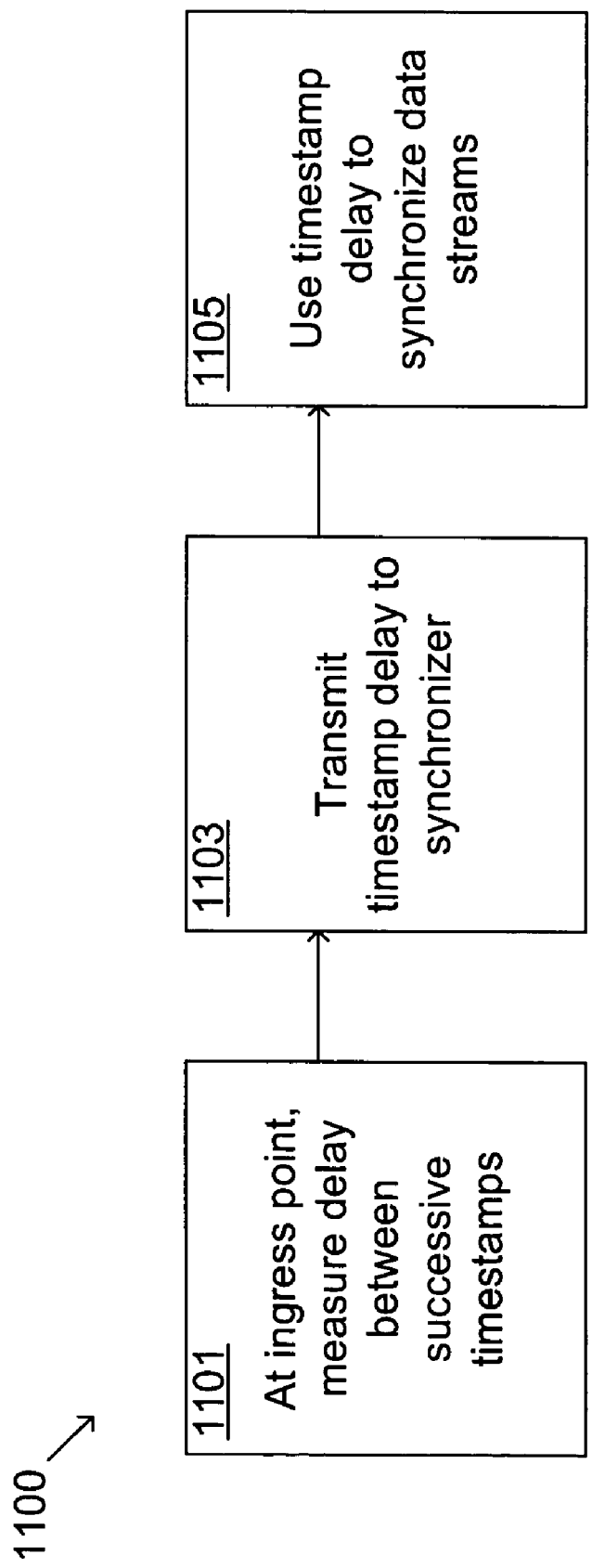
FIG. 11 is a flowchart of a fifth embodiment synchronizing packet network illustrating the use of timestamp delay measurements to correct jitter.

Another embodiment of the present invention uses calibration packets to correct for jitter. FIG. 11 is a flowchart 1100 of a fifth embodiment synchronizing packet network illustrating the use of timestamp delay measurements to correct jitter. In flowchart 1100, the delay between successive timestamps at the ingress is measured (block 1101). The timestamp delay is transmitted to a synchronizer (block 1103), and is then used to synchronize data streams (block 1105). It is preferred that the timestamp delay be transmitted through a proprietary packet, such as an RTP or RTCP packet.

The use of the steps of flowchart 1100 to correct for jitter can be applied to any of the previous embodiments if the frequencies of the generating terminals are very close, or if the time span between calibration packets is such that the frequencies do not significantly vary. The measured timestamp delay is thus a calibration that is used to synchronized data streams Consider, for example, the embodiment of FIG. 2A. if the frequency of clock 215 and 225 are close, then Fm/Fa≈1 and Equation (14) can be rearranged to give:

$$Tm2=Tm1+[Ta2-Ta1] \qquad (13')$$

where the term in brackets (Ta2-Ta1) is a measured time delay, and Equation (13') shows how synchronizer-egress 250 can update the timestamp of signal m based on measured delays in the timestamp of signal a. Equation (13') can be used, in general, to remove jitter between signals transmitted across a packet based network. Thus, for example, Ta and Tm can refer to any combination of video A, video B, and mixed audio timestamps. For the embodiment of FIG. 9, where the video is composed before the audio is mixed, Ta and Tm can refer to any combination of audio A, audio B, and composed video timestamps. In addition, synchronizer-egress 250 can either use Equation (13') to update the timestamp, or can use the information to synchronize data streams without updating the timestamps.

It should be appreciated that although the invention has been described in the context of the H.323 standard for lip syncing mixed audio and video streams, the invention is not limited to such contexts and may be utilized in various other applications and systems. For example, the invention is applicable to other applications for sending mixed audio and composed video together over packet networks. Also, it is applicable to video broadcast and MPEG audio/video switching and mixing.

The invention can also provide lip syncing by composing the video first, and then the audio, or by sequential mixing of various audio streams, followed by the combining of the video streams with the mixed audio. Thus, for example, two audio streams can be combined to form a first mixed audio stream and information about the timestamps of the two audio streams. The mixed audio stream can then be mixed with a third audio stream, and the information about the timestamp of the third audio stream can be added to the timestamp information. Also, the invention is applicable to synchronizing streams other than audio and video streams.

It is to be understood that the invention is not limited to providing synchronization of mixed audio and composed video, and that is can be applied to the combining of other data streams over a packet network, such as a network using RTP, and that furthermore it can be used to combine three or more groups of synchronized data streams.

One embodiment of each of the methods described herein is in the form of a computer program that executes on a processing system, e.g., a one or more processors, mixers, or composers that are part of a packet network. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM or DVD-RW.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the coding of the audio and video streams has not be discussed in detail, the invention is not limited to a specific coding method. Thus, for example, the video can be H.261, H.264, MPEG1, MPEG2, or MPEG4, and the invention is not limited to such contexts and may be utilized in various other applications and systems, for example in a system that other compressed media streams. Furthermore, the invention is not limited to any one type of network architecture and method of encapsulation, and thus may be utilized in conjunction with one or a combination of other network architectures/protocols.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of synchronizing streams of packets of audio data and video data over a network, comprising:

accepting a plurality of streams of packets of audio data from pairs of streams of packets of audio and video data, each stream of packets of audio data in each pair synchronized with the video data of the pair, such that each stream of packets of audio data includes a respective timestamp that is synchronized with a respective timestamp of a respective matching stream of packets of video data, the streams of audio and video data packets in one pair using timestamps that may be independent of the timestamps used in the streams of audio and video data packets of any other pair;

mixing the accepted streams of packets of audio data at a mixing time to form a combined stream of packets of synchronized mixed audio data having a mixing timestamp;

forming timing information that relates the values at or prior to the mixing time of the respective timestamps of the packets of the audio data of the accepted streams being mixed at the mixing time, such that the relationship at a later time of the mixing timestamp with the timestamps of the individual streams being mixed is derivable; and transmitting the combined stream, at least one of the plurality of streams of packets of video data whose audio data is mixed into the transmitted combined stream, and the formed timing information over the network;

such that a receiver, coupled to the network, receiving the timing information, the combined stream, and the at least one of the plurality of streams of packets of video data can use the formed timing information to synchronize the respective video data of the at least one stream of the plurality of streams of packets of video data with the mixed audio data of said combined stream, and such that no common network clock is needed for the mixing and no common network clock is needed to synchronize the respective video data of the at least one stream of the plurality of streams of packets of video data with the mixed audio data of said combined stream.

2. The method of claim 1, wherein said timing information includes the timestamps of at least one packet of audio data of each of the accepted streams of packets of audio data at the time of mixing.

3. The method of claim 1, wherein said forming timing information includes incorporating said timing information in a special header of the packets of said combined stream.

4. The method of claim 1, wherein said forming timing information includes forming a timestamp information packet separate from the packets containing the mixed audio data of said combined stream.

5. The method of claim 4, wherein the packets of said combined stream include an RTP packet.

6. The method of claim 4, wherein the packets of said combined stream include an RTCP packet.

7. The method of claim 1, wherein said timing information includes the ratio of the differences of sequential timestamps of packets of audio data of two of the accepted streams.

8. The method of claim 1, wherein said network is an IP network.

9. The method of claim 1, wherein said synchronizing by said receiver of said at least one stream of the plurality of streams of packets of video data with said mixed audio data of said combined stream includes updating at least one of the timestamps of the packets of said at least one stream of the plurality of streams of packets of video data with said mixing timestamp.

10. A method of synchronizing streams over a packet network, said method comprising:
forming timing information that relates the values at or prior to a mixing time of respective timestamps of the packets of a plurality of streams of packets of audio data used to form, at the mixing time, mixed synchronized audio data of a combined stream of packets by mixing the audio data of the plurality of streams of packets of audio data from a plurality of pairs, the combined stream of packets having a combined timestamp, each pair including a stream of packets of audio data and a matching stream of packets of video data, wherein the audio data in each stream of packets of audio data of a pair is synchronized with the video data of the matching stream of packets of video data of the pair, the audio and video data packets in any pair having respective timestamps that may be independent of the respective timestamps in the audio and video data packets in any other pair, such that the relationship at a later time of the combined timestamp with the timestamps of the individual streams being mixed is derivable using the timing information; and
transmitting over a network the combined stream, one or more matching streams of packets of video data of the pairs whose streams of packets of audio data are used in the mixing, and the formed timing information;
such that a receiver coupled to the network and receiving the combined stream and the timing information and further receiving at least one of the streams of packets of video data that is transmitted, can use the formed timing information to synchronize the video data of the received at least one matching stream of packets of video data with the mixed synchronized audio data of the combined stream, and
such that no common network clock is needed for the mixing and no common network clock is needed to synchronize the video data of the received at least one matching stream of packets of video data with the mixed synchronized audio data of the combined stream.

11. The method of claim 10, wherein said synchronizing by said receiver includes calculating synchronized timestamps for packets of said at least one stream of packets of video data of the pairs using said timing information, such that said synchronized timestamps synchronize the video data of said at least one stream with said mixed synchronized audio data of the combined stream.

12. The method of claim 10, wherein said timing information includes the timestamps of at least one packet of audio data of each of the streams of the audio data used to form the mixed synchronized audio data of the combined stream at the time of said mixing.

13. The method of claim 10, wherein said forming includes incorporating said timing information in a special header of the packets of said combined stream.

14. The method of claim 10, wherein said forming includes forming a timestamp information packet separate from the packets of said combined stream.

15. The method of claim 14, wherein the packets of said combined stream include an RTP packet.

16. The method of claim 14, wherein the packets of said combined stream include an RTCP packet.

17. The method of claim 10, wherein said timing information includes the ratio of the differences of sequential timestamps of two of the plurality of streams of packets of the audio data whose audio data is included in the synchronized mix of audio data of the combined stream.

18. The method of claim 10, wherein said network is an IP network.

19. The method of claim 10, wherein said synchronizing by said receiver of said at least one stream of the plurality of streams of packets of video data with said mixed audio data of said combined stream includes updating at least one of the timestamps of the packets of said at least one stream of the plurality of streams of packets of video data with said synchronized timestamps.

20. A method of synchronizing streams of packets of audio and video data over a network, said method comprising:
receiving, over the network, a combined stream of packets of a synchronized mix of audio data formed by mixing at a mixing time the audio data from a plurality of streams of packets of audio data, each stream of packets of audio data used in the mixing being from a pair of the stream of packets of audio data and a matching stream of video data, each pair of streams of packets of audio data and packets of video data synchronized and generated according to a respective clock that may be independent of the clock of any other pair, such that each stream of the plurality of packets of audio data used in the mixing includes a respective timestamp that is synchronized with a respective timestamp of a respective matching stream of packets of video data;
receiving, over the network, timing information that relates the respective values at or prior to the mixing time of the timestamps of the packets of the plurality of streams of packets of the audio data of the synchronized mix of audio data in the combined stream, the combined stream having a combined timestamp, such that the relationship at a later time of the combined timestamp with the timestamps of the individual streams being mixed is derivable using the timing information;
receiving, over the network, at least one of the plurality of matching streams of packets of video data whose respective pair has a respective stream of packets of audio data is mixed to form the mix of audio data of the combined stream; and
using the received timing information to synchronize respective video data of at least one of the received matching streams of packets of video data with said mix of audio data of said combined stream,
such that no common network clock is needed for the mixing and no common network clock is needed to synchronize the respective video data of at least one of the received matching streams of packets of video data with said mix of audio data of said combined stream.

21. The method of synchronizing of claim 20, further comprising:
calculating synchronized timestamps for packets of said at least one of the received matching streams of packets of video data using said timing information such that said synchronized timestamps synchronize the video data of said at least one of the received matching streams with said mix of audio data of the combined stream.

22. The method of synchronizing of claim 21, further including:
synchronizing said at least one stream of the received matching streams of packets of video data with said mix of synchronized audio data of said combined stream, including updating at least one of the timestamps of the packets of said at least one stream of the received matching streams of packets of video data with said synchronized timestamps.

23. The method of synchronizing of claim 20, wherein said timing information includes the timestamps of at least one packet of audio data of each of the streams of the audio data used to form said mix synchronized audio data of the combined stream at the time of mixing.

24. The method of synchronizing of claim 20, wherein said timing information includes information in a special header of the packets of said combined stream.

25. The method of synchronizing of claim 20, wherein said timing information includes a timestamp information packet separate from the packets of said combined stream.

26. The method of claim 25, wherein the packets of said combined stream include an RTP packet.

27. The method of claim 25, wherein the packets of said combined stream include an RTCP packet.

28. The method of synchronizing of claim 20, wherein said timing information includes the ratio of the differences of sequential timestamps of two of the plurality of streams of packets of the audio data whose audio data is included in said mix of synchronized audio data of the combined stream.

29. The method of synchronizing of claim 20, wherein said network is an IP network.

30. An apparatus configured to synchronize streams of packets of audio and video data, said apparatus comprising:
means for accepting configured to accept a plurality of streams of packets of audio data from pairs of streams audio and video data, each accepted stream of packets of audio data in each pair synchronized with a matching stream of packets of video data of the pair, the audio and video data in any pair timed according to a respective clock or clocks that may be independent of the respective clock or clocks use in timing the audio and video data in any other pair, such that each stream of packets of audio data includes a respective timestamp that is synchronized with a respective timestamp of a respective matching stream of packets of video data;
means for mixing, configured to mix, at a mixing time, —the audio data of the accepted streams to form a combined stream of packets of synchronized mixed audio data having a mixing timestamp;
means for forming timing information configured to form timing information that related the values at or prior to the mixing time of the timestamps of the packets of the accepted streams of audio data being mixed at the mixing time, such that the relationship at a later time of the mixing timestamp with the timestamps of the individual streams being mixed is derivable; and
means for transmitting configured to transmit the combined stream, at least one of the plurality of streams of packets of video data whose audio data is mixed into the transmitted combined stream, and the formed timing information over the network;
such that a receiver, coupled to the network, receiving the timing information, the combined stream, and at least one of the plurality of matching streams of packets of video data whose pair includes an accepted stream of packets of audio data can use the formed information to synchronize the timestamps of the packets of at least one of the plurality of matching streams of video data with the timestamps of said combined stream, and
such that no common network clock is needed for the mixing and no common network clock is needed to synchronize the timestamps of the packets of at least one of the plurality of matching streams of video data with the timestamps of said combined stream.

31. The apparatus of claim 30, wherein said timing information includes the timestamps of at least one packet of audio data of each of the accepted streams of packets of audio data at the time of mixing by the means for mixing.

32. The apparatus of claim 30, wherein said means for forming timing information is configured to incorporate said timing information in a special header of the packets of said combined stream.

33. The apparatus of claim 30, wherein said means for forming timing information is configured to form a timestamp information packet separate from the packets of said combined stream.

34. The apparatus of claim 30, wherein said timing information includes the ratio of the differences of sequential timestamps of packets of audio data of two of the accepted streams.

35. The apparatus of claim 30, wherein said network is an IP network.

36. The apparatus of claim 30,
wherein the synchronizing by the receiver of said at least one matching stream of video data with said combined stream includes updating at least one of the timestamps of the packets of said at least one matching stream of video data with said synchronized timestamps.

37. An apparatus configured to synchronize streams over a packet network, said apparatus comprising:
means for forming timing information that relates the values at or prior to a mixing time of respective timestamps of the packets of a plurality of streams of packets of audio data used to form mixed synchronized audio data of a combined stream of packets by mixing, at the mixing time, the audio data of the plurality of streams of packets of audio data from a plurality of pairs, the combined stream of packets having a combined timestamp, each pair including a stream of packets of audio data and a matching stream of packets of video data, wherein the audio data in each stream of packets of audio data of a pair is synchronized with the video data of the matching stream of packets of video data of the pair, the audio and video data packets in any pair having respective timestamps that may be independent of the respective timestamps in the audio and video data packets in any other pair, such that the relationship at a later time of the combined timestamp with the timestamps of the individual streams being mixed is derivable using the timing information; and
means for transmitting, over a network, the means for transmitting configured to transmit the combined stream, one or more matching streams of packets of video data of the pairs whose streams of packets of audio data are used in the mixing, and the timing information;

such that a receiver, coupled to the network, and receiving the combined stream and the timing information, and further receiving at least one matching stream of the matching streams of packets of video data of the pairs whose streams of packets of audio data are used in the mixing can use the timing information to synchronize the one or more matching streams of packets of video data with the packets of the combined stream, and such that no common network clock is needed for the mixing and no common network clock is needed to synchronize the one or more matching streams of packets of video data with the packets of the combined stream.

38. The apparatus of claim 37,
wherein said synchronizing by said receiver includes calculating synchronized timestamps for packets of said at least one stream of packets of video data of the pairs using said timing information, such that said synchronized timestamps synchronize the video data of said at least one stream with said mixed synchronized audio data of the combined stream.

39. The apparatus of claim 38,
wherein said synchronizing by said receiver of said at least one stream of the plurality of streams of packets of video data with said mixed audio data of said combined stream includes updating at least one of the timestamps of the packets of said at least one stream of the plurality of streams of packets of video data with said synchronized timestamps.

40. The apparatus of claim 37, wherein said timing information includes the timestamps of at least one packet of audio data of each of the streams of the audio data used to form the mixed synchronized audio data of the combined stream at the time of said mixing.

41. The apparatus of claim 37, wherein said means for forming includes means for incorporating said timing information in a special header of the packets of said combined stream.

42. The apparatus of claim 37, wherein said means for forming is configured to form a timestamp information packet separate from the packets of said combined stream.

43. The apparatus of claim 37, wherein said timing information includes the ratio of the differences of sequential timestamps of two of the plurality of streams of packets of the audio data whose audio data is included in the synchronized mix of audio data of the combined stream.

44. The apparatus of claim 37, wherein said network is an IP network.

45. A method of synchronizing audio and video streams over a network, said method comprising:
receiving over a network timing information that relates the values at or prior to a mixing time of respective timestamps of a plurality of streams of packets of audio data used to form, at the mixing time, a combined stream of packets of a synchronized mix of audio data, the combined mix having a combined timestamp, each stream of packets of audio data used to form the combined stream being from a pair of the stream of packets of audio data and a matching stream of video data, each pair of streams of packets of audio data and packets of video data synchronized and generated according to a respective clock that may be independent of the clock of any other pair, such that each stream of the plurality of packets of audio data used in the mix includes a respective timestamp that is synchronized with a respective timestamp of a respective matching stream of packets of video data, the timing information being such that the relationship at a later time of the combined timestamp with the timestamps of the individual streams being mixed is derivable using the timing information; and
calculating synchronized timestamps for the video data of at least one stream of packets of video data whose pair includes a stream of audio data used to form a combined stream, the calculating using said timing information, the calculating not requiring use of a common network clock, such that a receiver coupled to the network and receiving the combined stream of packets of the synchronized mix of audio data, the timing information, and at least one matching stream of packets of video data whose pair includes a stream of audio data used to form the combined stream, can use the calculated synchronized timestamps to synchronize the video data of the at least one received matching stream with the mix of synchronized audio data of the combined stream, and such that no common network clock is needed for the mixing and no common network clock is needed to synchronize the video data of the at least one received matching stream with the mix of synchronized audio data of the combined stream.

46. The method of synchronizing of claim 45, wherein said timing information includes the timestamps of at least one packet of audio data of each of the streams of the audio data used to form said synchronized mix of audio data of the combined stream at the time of forming the synchronized mix.

47. The method of synchronizing of claim 45, wherein said timing information includes information in a special header of the packets of said combined stream.

48. The method of synchronizing of claim 45, wherein said timing information includes a timestamp information packet separate from the packets of said combined stream.

49. The method of synchronizing of claim 45, wherein said timing information includes the ratio of the differences of sequential timestamps of two of the plurality of streams of packets of the audio data whose audio data in included in said synchronized mix of audio data of the combined stream.

50. The method of synchronizing of claim 45, wherein said network is an IP network.

51. The method of synchronizing of claim 45:
wherein said synchronizing by said receiver of the video data of said at least one stream of packets of video data whose pair includes a stream of audio data used to form the combined stream with said synchronized mix of audio data of said combined stream includes updating at least one of the timestamps of the packets of said at least one stream of packets of video data with said synchronized timestamps.

52. A computer readable storage medium having coded thereon instructions which, when executed by one or more processors of a processing system, cause performing the steps of a method of synchronizing streams over a network, said method comprising:
forming timing information that relates the values at or prior to a mixing time of respective timestamps of the packets of a plurality of streams packets of audio data used to form, at the mixing time, mixed synchronized audio data of a combined stream of packets by mixing the audio data of the plurality of streams of packets of audio data from a plurality of pairs, the combined stream of packets having a combined timestamp, each pair including a stream of packets of audio data and a matching stream of packets of video data, wherein the audio data in each stream of packets of audio data of a pair is synchronized with the video data of the matching stream of packets of video data of the pair, the audio and video data packets in any pair having respective timestamps that may be independent of the respective timestamps in the audio and video data packets in any other pair, such that the relationship at a later time of the combined timestamp with the timestamps of the individual streams being mixed is derivable using the timing information; and transmitting over a network the combined stream, one or more matching streams of packets of video data of the pairs whose streams of packets of audio data are used in the mixing, and the formed timing information, such that a receiver coupled to the network and receiving the combined stream and the timing information and further receiving at least one of the streams of packets of video data that is transmitted, can use the formed timing information to synchronize the video data of the received at least one matching stream of packets of video data with the mixed synchronized audio data of the combined stream, and such that no common network clock is needed for the mixing and no common network clock is needed to synchronize the video data of the received at least one matching stream of packets of video data with the mixed synchronized audio data of the combined stream.

53. A computer readable storage medium of claim 52, wherein said synchronizing by said receiver includes calculating synchronized timestamps for packets of said at least one stream of packets of video data of the pairs using said timing information, such that said synchronized timestamps synchronize the video data of said at least one stream with said mixed synchronized audio data of the combined stream.

54. A computer readable storage medium of claim 53, said method further including:
wherein said synchronizing by said receiver of said at least one stream of the plurality of streams of packets of video data with said mixed audio data of said combined stream includes updating at least one of the timestamps of the packets of said at least one stream of the plurality of streams of packets of video data with said synchronized timestamps.

55. A computer readable storage medium of claim 52, wherein said timing information includes the timestamps of at least one packet of audio data of each of the streams of the audio data used to form the mixed synchronized audio data of the combined stream at the time of said mixing.

56. A computer readable storage medium of claim 52, wherein said forming includes incorporating said timing information in a special header of the packets of said combined stream.

57. A computer readable storage medium of claim 52, wherein said forming includes forming a packet separate from the packets of said combined stream.

58. A computer readable storage medium of claim 52, wherein said timing information includes the ratio of the differences of sequential timestamps of two of the plurality of streams of packets of the audio data whose audio data is included in the synchronized mix of audio data of the combined stream.

59. A computer readable storage medium of claim 52, wherein said network is an IP network.

60. An apparatus for synchronizing streams of packets of audio and video data over a network, said apparatus comprising:
a first device configured to accept a plurality of streams of packets of audio data from pairs of streams of packets of audio and video data, each stream of packets of audio data in each pair synchronized with the video data of the pair, such that each stream of packets of audio data includes a respective timestamp that is synchronized with a respective timestamp of a respective matching stream of packets of video data, the streams of audio and video data packets in one pair using timestamps that may be independent of the timestamps used in the streams of audio and video data packets of any other pair, the first device further configured to mix at a mixing time the accepted streams of packets of audio data to form a combined stream of packets of synchronized mixed audio data having a mixing timestamp;

a second device configured to form timing information that relates values at or prior to the mixing time of the timestamps of the packets of the accepted plurality of streams of packets of audio data used to form the combined stream, such that the relationship at a later time of the mixing timestamp with the timestamps of the individual streams being mixed is derivable; and a transmitter configured to transmit the combined stream, at least one of the plurality of streams of packets of video data whose audio data is mixed into the transmitted combined stream, and the formed timing information over the network;

such that a receiver, coupled to the network, receiving the timing information, the combined stream, and the at least one of the plurality of streams of packets of video data can use the formed timing information to synchronize the respective video data of the at least one stream of the plurality of streams of packets of video data with the mixed audio data of said combined stream, and such that no common network clock is needed for the mixing and no common network clock is needed to synchronize the respective video data of the at least one stream of the plurality of streams of packets of video data with the mixed audio data of said combined stream.

61. The apparatus of claim 60, wherein said first device is configured to accept the timing information from said second device and encapsulates said timing information in said combined stream.

62. The apparatus of claim 61, wherein said timing information is included in packet headers of said packets of said combined stream.

63. The apparatus of claim 61, wherein said timing information is included in packet payloads of said packets of said combined stream.

64. The apparatus of claim 60, wherein said second device forms said timing information in a timestamp information stream for transmitting over the network.

65. The apparatus of claim 60, wherein said network is an IP network.

66. The apparatus of claim 60, wherein said synchronizing by said receiver of the video data of said at least one stream of packets of video data includes updating at least one of the timestamps of the packets of said at least one stream of packets of video data with said mixing timestamp.

67. The apparatus of claim 60, wherein said packets of said combined stream include an RTP packet.

68. The apparatus of claim 60, wherein said packets of said combined stream include an RTCP packet.

\* \* \* \* \*

UNITED STATES PATENT AND TRADEMARK OFFICE
CERTIFICATE OF CORRECTION

PATENT NO. : 7,664,057 B1
APPLICATION NO. : 10/890581
DATED : February 16, 2010
INVENTOR(S) : Wu et al.

It is certified that error appears in the above-identified patent and that said Letters Patent is hereby corrected as shown below:

In Column 14, line 38, kindly replace "TSVBU)" with --TSVB(j)--

Signed and Sealed this

Sixth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,664,057 B1 Page 1 of 1
APPLICATION NO. : 10/890581
DATED : February 16, 2010
INVENTOR(S) : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1094 days.

Signed and Sealed this

Twenty-eighth Day of December, 2010

David J. Kappos
*Director of the United States Patent and Trademark Office*